United States Patent [19] [11] Patent Number: 6,043,849
Imanaka et al. [45] Date of Patent: *Mar. 28, 2000

[54] SIMILAR CHANGE INFORMATION TAKEOUT METHOD, SIMILAR CHANGE INFORMATION TAKEOUT APPARATUS, AND TELETEXT RECEIVER

[75] Inventors: Takeshi Imanaka, Nara; Atsushi Tanaka, Neyagawa; Tetsuya Yagi, Katano, all of Japan

[73] Assignee: Matsushita Electric Industrial Co., Ltd., Osaka, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/649,966

[22] Filed: May 15, 1996

[51] Int. Cl.⁷ .................................................. H04N 5/445
[52] U.S. Cl. ............................ 348/468; 348/465; 382/219
[58] Field of Search ...................................... 348/468, 465, 348/466, 461, 467, 473, 476–478; 371/31, 49.1; 382/187, 201, 219

[56] References Cited

U.S. PATENT DOCUMENTS

| | | | |
|---|---|---|---|
| 4,700,322 | 10/1987 | Benbassat et al. | 364/926 |
| 5,355,170 | 10/1994 | Eitz et al. | 348/468 |
| 5,374,961 | 12/1994 | Jung | 348/468 |
| 5,430,491 | 7/1995 | Park | 348/468 |
| 5,519,780 | 5/1996 | Woo et al. | 348/468 |
| 5,650,826 | 7/1997 | Eitz | 348/468 |
| 5,654,763 | 8/1997 | Bruckner et al. | 348/468 |
| 5,677,739 | 10/1997 | Kirkland | 348/468 |
| 5,691,776 | 11/1997 | Van Gestel | 348/468 |
| 5,729,298 | 3/1998 | Wester | 348/468 |

FOREIGN PATENT DOCUMENTS

| | | | |
|---|---|---|---|
| 503 070 | 8/1991 | European Pat. Off. | H04N 7/08 |
| 529 700 | 7/1992 | European Pat. Off. | H04N 7/087 |
| 581 994 | 8/1992 | European Pat. Off. | H04N 7/087 |
| 609 934 | 1/1994 | European Pat. Off. | H04N 7/084 |
| 693 855 | 7/1995 | European Pat. Off. | H04N 7/087 |
| 1268379 | 10/1989 | Japan | H04N 7/08 |
| 7203392 | 8/1995 | Japan | H04N 7/03 |

*Primary Examiner*—Vu Le
*Attorney, Agent, or Firm*—Ratner & Prestia

[57] ABSTRACT

A similar change information takeout apparatus is intended to take out automatically unit containing similar change information when character row data divided in certain units are given in a multiplicity, and comprises an input unit in which character row data are entered sequentially in time series, a former data memory unit for storing character row data, a start/stop input unit for accepting an input for designating start or stop of output of similar change information from the user, a new data unit takeout process for taking out sequentially the units contained in new data, a unit comparison process for comparing the units taken out in the new data unit takeout process and the units contained in former data to see if different or same character by character contained in the units sequentially, a different character and type counting process for calculating the variety and number of different or same characters as a result of comparison in the unit comparison process, and a similarity judging process for judging similarity between units in certain condition on the basis of the result of calculation of the different character and type counting process.

29 Claims, 28 Drawing Sheets

Fig. 4

| Unit 1 | Unit 2 | Unit 3 | ... | Unit n |

Unit 1

9日のJリーグ

| 名古屋 | 1－6 | 横浜M | （長良川） |
|---|---|---|---|
| 横浜F | 0－0 | 鹿島 | （前半） |
| 平塚 | 0－0 | 浦和 | （前半） |
| 清水 | 0－1 | 広島 | （前半） |
| 磐田 | 1－0 | 市原 | （前半） |
| 大阪 | 0－1 | 川崎 | （前半） |

Unit 2

大相撲九州場所4日目

| 勝 | | | 負 |
|---|---|---|---|
| 曙 | おしだし | 武双山 | |
| 琴錦 | ひきおとし | 武蔵丸 | |
| 貴乃花 | よりきり | 肥後ノ海 | |
| 若乃花 | つきおとし | 時津洋 | |
| 貴ノ浪 | よりきり | 小錦 | |
| 貴闘力 | おしだし | 大至 | |

Unit 3

大相撲九州場所4日目

| 勝 | | | 負 |
|---|---|---|---|
| 魁皇 | よりきり | 琴別府 | |
| 安芸乃島 | よりきり | 濱ノ嶋 | |
| 琴乃若 | おしたおし | 旭道山 | |
| 琴稲妻 | よりきり | 三杉里 | |
| 舞の海 | よりきり | 大善 | |
| 朝乃若 | おしだし | 栃乃和歌 | |

Unit 4

東亜大、創価高が初優勝

第25回明治神宮野球大会最終日は9日、神宮球場で行われ、大学は東亜学大（東京）が6大学）が4－3で青学大（東京）を下した。高校は創価（東京）が6－3で星陵に勝ち、ともに初優勝を飾った。

Unit 5

Unit 1

9日のJリーグ
名古屋 1-6 横浜M (長良川)
横浜F 0-2 鹿島 (鹿島)
平塚 2-0 浦和 (平塚)
清水 2-1 広島 (草薙)
磐田 1-0 市原 (磐田)
大阪 1-3 川崎 (万博)

Unit 2

川崎首位堅持,平塚も白星
Jリーグ・ニコスシリーズ第19節
(9日)、川崎が大阪に逆転勝ちで
15勝目(4敗)を挙げ首位を堅持。
2位平塚も川崎を追走。名古屋は
横浜Mに大敗し,ついに7連敗。

Unit 3

大相撲九州場所4日目

| 勝 | | | 負 |
|---|---|---|---|
| 曙 | おしだし | 武双山 | |
| 琴錦 | ひきおとし | 武蔵丸 | |
| 貴乃花 | よりきり | 肥後ノ海 | |
| 若乃花 | つきおとし | 時津洋 | |
| 貴ノ浪 | よりきり | 小錦 | |
| 貴闘力 | おしだし | 大至 | |

Unit 4

東亜大,創価高が初優勝
第25回明治神宮野球大会最終日
は9日,神宮球場で行われ,大学
は東亜学大(広島6大学)が4-3
で青学大(東京)を下した。高校は
創価(東京)が6-3で星陵に勝ち,
ともに初優勝を飾った。

Unit 5

UNIT 1

Second seeds Kansas, Wake Forest, Georgetown and Cincinnati advanced to the N-C-A-A men's Basketball Tournament Sweet 16 with victories Sunday. However, third-seeded Villanova was knocked out of the Tournament by sixth-seeded Louisville.

UNIT 2

```
         Results (Baseball)
Braves    1-6   Cubs       (Chicago)
Reds      2-3   Rockies    (Colorado)
Marlins   1-4   Astros     (Houston)
Dogers    4-2   Expos      (Los Angeles)
Mets      3-0   Pirates    (New York)
Phillies  0-0   Padres     (San Diego)
```

UNIT 3

Chicago Bulls forward Dennis Rodman faces a suspension by the N-B-A for his wild theatrics in Saturday night's game at New Jersey.

UNIT 4

Liselotte Neumann of Sweden fired a 4-under-par 68 Sunday and rallied past a faltering Danielle Ammaccapane for a one-shot victory at the $450,000 L-P-G-A Ping/Welch's Championship at the Randolph Park North Golf Course in Tucson, Arizona.

Fig. 27

UNIT 1

Fifth seed Michael Chang of the United States captured his second career Champions Cup title Sunday by defeating unseeded Paul Haarhuis of the Netherlands, 7-5, 6-1, 6-1, in the finals of the $1.95 million Championships at Indian Wells, California.

UNIT 2

```
        Results(Baseball)
Braves    1-7  Cubs      (Chicago)
Reds      2-3  Rockies   (Colorado)
Marlins   1-4  Astros    (Houston)
Dogers    4-4  Expos     (Los Angeles)
Mets      3-0  Pirates   (New York)
Phillies  0-0  Padres    (called off)
```

UNIT 3

The New York Mets added insurance for injured first baseman Rico Brogna Sunday when they acquired left-handed hitting first baseman Roberto Petagine from the San Diego Padres for pitchers Pete Walker and Scott Adair.

UNIT 4

Liselotte Neumann of Sweden fired a 4-under-par 68 Sunday and rallied past a faltering Danielle Ammaccapane for a one-shot victory at the $450,000 L-P-G-A Ping/Welch's Championship at the Randolph Park North Golf Course in Tucson, Arizona.

Fig. 29
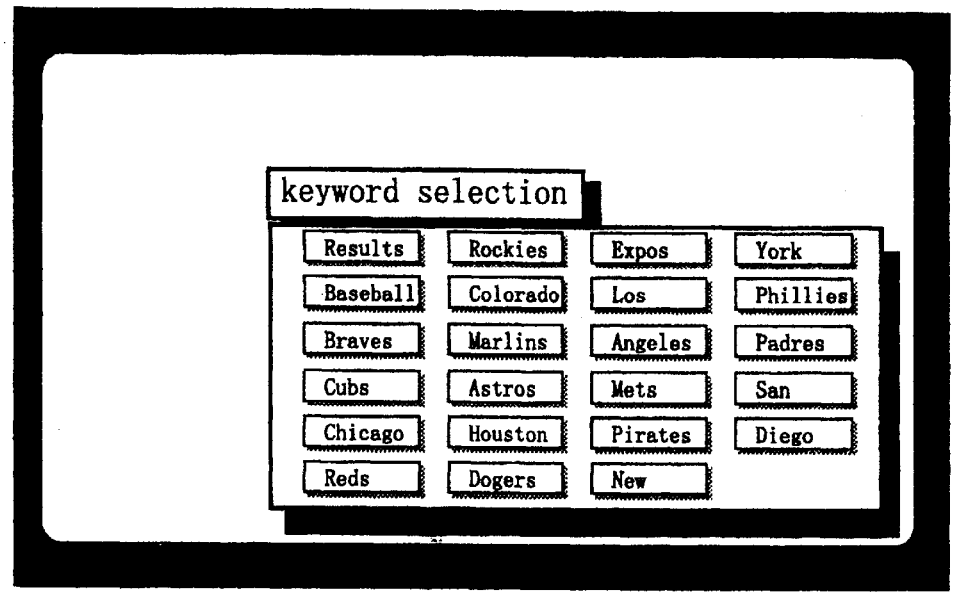
Fig. 30
```
Olympic Game(Baseball)
United States
000 000 0
000 000
Japan
```
Fig. 31
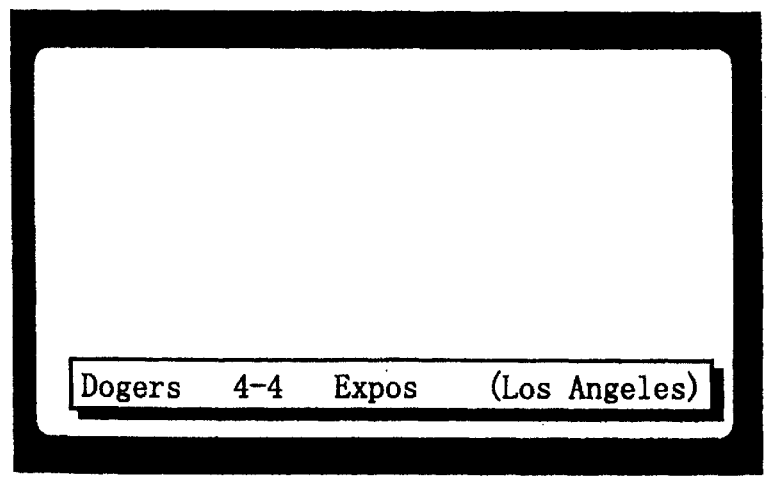

6,043,849

SIMILAR CHANGE INFORMATION TAKEOUT METHOD, SIMILAR CHANGE INFORMATION TAKEOUT APPARATUS, AND TELETEXT RECEIVER

BACKGROUND OF THE INVENTION

1. Field of the Invention

The present invention relates to a similar change information takeout method, similar change information takeout apparatus, and teletext receiving apparatus applicable to a case for making use of information updated moment after moment, from character row data given in time series and divided in specified unit such as teletext.

2. Related Art of the Invention

Recently, in the day of multimedia, much information is presented not only from the package media such as CD-ROM, but also through communication, broadcast and the like. Examples of such information include, aside from picture and sound, character information by so-called electronic book and character information. The character information is expressed in character codes that can be processed easily by computer, such as ASCII code and JIS code.

Incidentally, as an important difference between the information presented by communication or broadcast and the information presented by package media such as CD-ROM, instantaneity is known. When compared with package media, the information obtained by communication or broadcast is characterized as being presented instantly.

That is, in communication or broadcast, a large mass of information is presented, including the information updated moment after moment and the information not changed in a short time, so that the user is allowed to pickup only necessary information therefrom. In the information changing moment after moment, there is bullet information for presenting information along with change of the time regarding a same subject. Such example is information of sports bulletin.

Moreover, recently, receivers handling character information transmitted as character codes by broadcast are developed and sold, and the character information presented to the household is increasing rapidly. The teletext is presented in multiple programs, and the form of information is characters and is presented over plural pages, and hence the user obtains information by reading while turning pages of the statements shown on the screen of television or the like.

For example, when the user makes use of the teletext of the television, it may be utilized as the means of knowing the progress of the game of the sport actually played at that moment.

In such manner of use, the user searches the corresponding page displaying the progress of the desired game of the sport as bullet information, and sees the displayed data. By repeating such action often, the progress of the game is known.

In such conventional teletext receiver, however, it is necessary to obtain information of the statement shown on the television screen while turning the pages. Therefore, to understand the whole information, it was troublesome to read lots of characters, or read sequentially while turning the pages.

In particular, to obtain information that changes with the time, such trouble is further increased. In this specification, such information changing with the time is called similar change information.

More specifically, for example, in the news program of teletext, in the character row data extended over plural pages, the pages containing similar change information and pages containing general information are presented in mixture. In this case, if desired to obtain similar change information from plural pages, (1) a page containing changing information must be searched while reading sequentially page after page, and (2) the user does not know when the changing information is updated, and therefore it is forced to refer to the information frequently whether updated or not. It hence increases the time spent for obtaining necessary information, which is a bottleneck for increasing the number of users enjoying the teletext.

SUMMARY OF THE INVENTION

In consideration of the above problems, it is hence a primary object of the invention to present similar change information takeout method, similar change information takeout apparatus, and teletext receiving apparatus capable of obtaining information changing with the time more easily than in the prior art.

The invention is a similar change information takeout method which comprises the steps of:

feeding character row data divided into certain units in time series having a certain time interval, comparing matching points and/or different points of earlier entered character row data and successive later character row data in the every unit, judging presence or absence of similarity between units of character row data to be compared on the basis of the result of comparison, and issuing the unit judged to have similarity, out of the units in the later character row data, when judged to have similarity as a result of comparing and judging.

The invention is a similar change information takeout apparatus which comprises:

input means in which character row data divided into certain units is entered in time series having a certain interval, first memory means for storing the earlier entered character row data out of character row data entered in time series, second memory means for storing the later entered character row data out of the character row data entered in time series, comparing and judging means for comparing matching point and/or different point of the character row data of the first memory means and character row data of the second memory means in the every unit, and judging presence or absence of similarity between units of character row data to be compared on the basis of the result of comparison, output means for outputting the unit judged to have similarity out of the units in the second memory means when judged to have similarity by the comparing and judging means, and update control means for (1) updating the content of the first memory means by the character row data of the second memory means after comparing and judging by the comparing and judging means and (2) updating the content of the second memory by the new character row data entered from the input means.

The invention is a similar change information takeout apparatus of above mentioned invention, further comprising display means for displaying the unit outputted from the output means, wherein the outputted unit is displayed continuously by the display means until the output means next issues a new unit similar to that unit, and when the output means issues the new unit, it is told that the unit being displayed so far is updated.

The invention is a similar change information takeout apparatus of above mentioned invention, further comprising display means for displaying the unit outputted from the output means, wherein the outputted unit is displayed by the display means for the predetermined certain time.

The invention is a similar change information takeout apparatus of above mentioned invention, wherein the certain time is the time from the output from the output means until next new character row data is entered from the input means.

The invention is a similar change information takeout apparatus which comprises:

input means in which character row data divided into certain units is entered in time series, first memory means for storing the earlier entered character row data out of character row data entered in time series, second memory means for storing the later entered character row data out of the character row data entered in time series, comparing and judging means for comparing matching point and/or different point of the character row data of the first memory means and character row data of the second memory means in the every unit, and judging presence or absence of similarity between units of character row data to be compared on the basis of the result of comparison, output means for searching and outputting the unit containing a keyword, by making use of an entered keyword, from plural units judged to have similarity out of the units in the second memory means when judged to have similarity by the comparing and judging means, and update control means for (1) updating the content of the first memory means by the character row data of the second memory means after comparing and judging by the comparing and judging means and (2) updating the content of the second memory by the new character row data entered from the input means.

The invention is a similar change information takeout apparatus which comprises:

input means in which character row data divided into certain units is entered in time series, first memory means for storing the earlier entered character row data out of character row data entered in time series, second memory means for storing the later entered character row data out of the character row data entered in time series, comparing and judging means for selecting units containing an entered keyword when comparing matching point and/or different point of the character row data of the first memory means and character row data of the second memory means, comparing in the each unit between the selected units, and judging presence or absence of similarity between the units of character row data to be compared on the basis of the result of comparison, output means for outputting the unit judged to have similarity out of the units in the second memory means when judged to have similarity by the comparing and judging means, and update control means for (1) updating the content of the first memory means by the character row data of the second memory means after comparing and judging by the comparing and judging means and (2) updating the content of the second memory by the new character row data entered from the input means.

The invention is a similar change information takeout apparatus which comprises:

input means in which character row data divided into certain units is entered in time series having a certain interval, first memory means for storing the earlier entered character row data out of character row data entered in time series, second memory means for storing the later entered character row data out of the character row data entered in time series, comparing and judging means for comparing matching point and/or different point of the character row data of the first memory means and character row data of the second memory means in the every unit, and judging presence or absence of similarity between units of character row data to be compared on the basis of the result of comparison, portion retrieval means for searching data of portion in the unit including a keyword, by using an entered keyword, from the unit judged to have similarity out of the units of the second memory means when judged to have similarity by the comparing and judging means, change judging means for judging whether the searched data is changed from the memory content in the first memory means or not, output means for outputting the data when judged to have been changed as a result of judging, and update control means for (1) updating the content of the first memory means by the character row data of the second memory means after comparing and judging by the change judging means and (2) updating the content of the second memory by the new character row data entered from the input means.

The invention is a similar change information takeout apparatus which comprises:

input means in which character row data divided into certain units is entered in time series having a certain interval, first memory means for storing the earlier entered character row data out of character row data entered in time series, second memory means for storing the later entered character row data out of the character row data entered in time series, comparing and judging means for comparing matching point and/or different point of the character row data of the first memory means and character row data of the second memory means in every data of portion in the unit, including an entered keyword, and judging presence or absence of similarity between data of the portions to be compared on the basis of the result of comparison, output means for outputting the data of the portion judged to have similarity out of the units in the second memory means when judged to have similarity by the comparing and judging means, and update control means for (1) updating the content of the first memory means by the character row data of the second memory means after comparing and judging by the comparing and judging means and (2) updating the content of the second memory by the new character row data entered from the input means.

According to a first aspect of the invention, units contained in the data stored as new data are taken out sequentially, and compared sequentially character by character contained in the units with the units contained in the data stored as former data to see whether different or same, and the variety and number of different or same characters are calculated, the similarity between units is judged in specific condition according to the result of calculation, and the unit judged to be similar as a result of this judgement is issued to output means as the unit containing bulletin information. Hence, neither the unit completely matched in the content nor the unit completely different in the content, the bulletin information same in the majority of the content but updated only in part of the content moment by moment such as sports bulletin can be taken out.

According to a second aspect of the invention, units contained in the data stored as new data are taken out sequentially, and compared sequentially character by character contained in the units with the units contained in the data stored as former data to see whether different or same, and the variety and number of different or same characters are calculated, the similarity between units is judged in specific condition according to the result of calculation, and the unit judged to be similar as a result of this judgement is stored, and only the unit containing a keyword designated by the user is searched and issued to the output means as the unit containing the bullet information required by the user.

According to a third aspect of the invention, units contained in the data stored as new data are taken out sequentially, and compared sequentially character by character contained in the units with the units contained in the data stored as former data to see whether different or same, and the variety and number of different or same characters are calculated, the similarity between units is judged in specific condition according to the result of calculation, and the unit judged to be similar as a result of this judgement is stored. From the stored units, only the unit containing a keyword designated by the user is searched, and from the searched unit, only the portion containing the keyword designated by the user is taken out and issued to the output means.

BRIEF DESCRIPTION OF THE DRAWINGS

FIG. 4 is a diagram showing a data example of input data in the same embodiment;

FIG. 5 is a diagram showing a data example of input data containing similar change information in the same embodiment;

FIG. 6 is a diagram showing a data example of input data containing similar change information in the same embodiment;

FIG. 26 is a diagram showing a data example of input data in the first embodiment of the first aspect of the invention;

FIG. 27 is a diagram showing a data example of input data in the first embodiment of the first aspect of the invention;

FIG. 29 is a diagram showing a keyword presentation example in a fourth embodiment of the second aspect of the invention;

FIG. 30 is a diagram showing an example of unit contained in input data in the fourth embodiment of the second aspect of the invention; and FIG. 31 is a diagram showing an output example in a seventh embodiment of the third aspect of the invention.

DESCRIPTION OF THE REFERENCE NUMERALS

Figure 1:
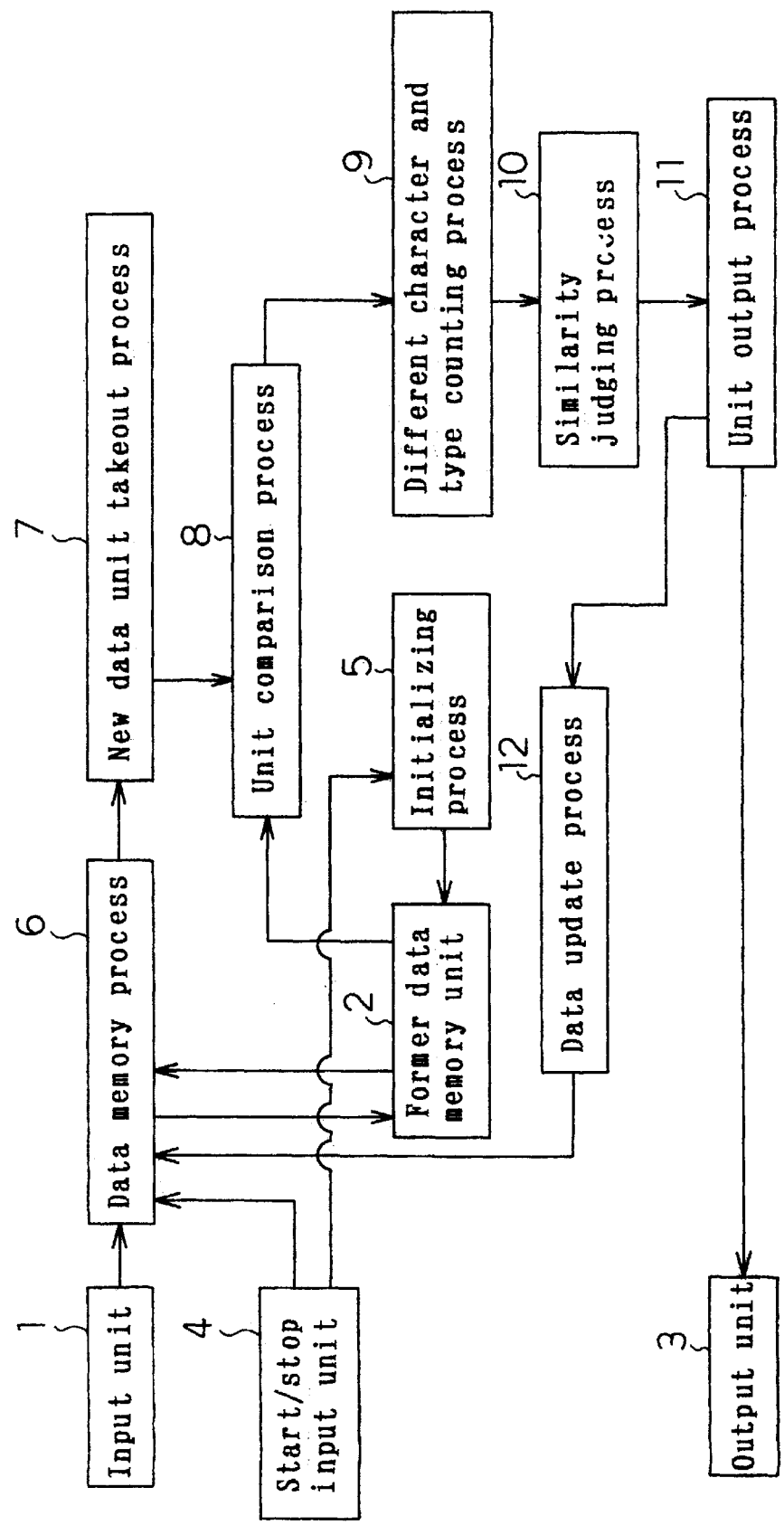
FIG. 1 is a block diagram showing a system configuration of similar change information takeout method and similar change information takeout apparatus in a first embodiment of a first aspect of the invention.

1 Input unit
2 Former data memory unit
3 Output unit
4 Start/stop input unit
5 Initializing process
6 Data memory process
7 New data unit takeout process
8 Unit comparison process
9 Different character and type count process
10 Similarity judging process
11 Unit output process
12 Data update process
21 VRAM
22 Main memory device
23 External memory device
24 CPU
31 Character broadcast receiving unit
41 Voice output unit
51 Designation input unit
52 Keyword select/input unit
53 Unit memory process
54 Keyword takeout process
55 Keyword memory process
56 Unit retrieval process
61 Similar unit memory process
62 Portion retrieval process
63 Portion update judging process

PREFERRED EMBODIMENTS (Embodiment 1)

Referring now to the drawings, a first embodiment of a first aspect of the invention is described in detail below.

The first embodiment relates to a similar change information takeout apparatus.

FIG. 1 is a system configuration diagram of the first embodiment. In FIG. 1, reference numeral 1 is an input unit divided into specified units for receiving input of character row data having each character expressed in character code sequentially in time series, and 2 is a former data memory unit for storing character row data. The first memory means of the invention corresponds to the former data memory unit 2. Reference numeral 3 is an output unit for displaying the unit containing the similar change information in the input data, and 4 is a start/stop input unit for receiving input for specifying output start or output stop of similar change information from the user. The display means of the invention corresponds to the output unit 3. Reference numeral 5 is an initializing process for storing an identifier showing the data is empty as initial value in the former data memory unit 2, when designation of output start of similar change information is entered from the start/stop input unit 4. Reference numeral 6 is a data memory process for erasing the identifier and storing the character row data entered from the input means as former data in the former data memory means when the identifier showing the data is empty is stored in the former data memory unit 2, or, otherwise, storing the input data as new data. The second memory means of the invention corresponds to the data memory process 6. Reference 7 is a new data unit takeout process for taking out the units contained in the new data sequentially, and 8 is a unit comparison process for comparing the units taken out in the new data unit takeout process 7 and the units contained in the former data, character by character contained in both units to see if same or different. Reference numeral 9 is a different character and type count process for counting the variety and number of same or different characters as a result of comparison in the unit comparison process 8. Reference numeral 10 is a similarity judging process for judging similarity between units in specific condition on the basis of the calculation result of the different character and type count process 9, and 11 is a unit output process for issuing the unit contained in the new data judged to be similar as a result of judgement by the similarity judging process 10 to the output unit 3 as the unit containing the similar change information. The comparing and judging means of the invention is the means comprising the unit comparison process 8, different character and type count process 9, and similarly judging process 10. The output means of the invention corresponds to the unit output process 11. Reference numeral 12 is a data update process for transferring the new data to the former data memory unit 2 in order to update the data in the former data memory unit 2. The update control means of the invention corresponds to the data update process 12. Meanwhile, the data memory process 6 stops processing about input data when designation of output stop of similar change information is entered from the start/stop input unit 4, and thereby stops processing in all other processes and units. The control means of the invention is the means comprising the unit comparison process 8, different character and type count process 9, similarity judging process 10, and data update process 12.

Figure 2:
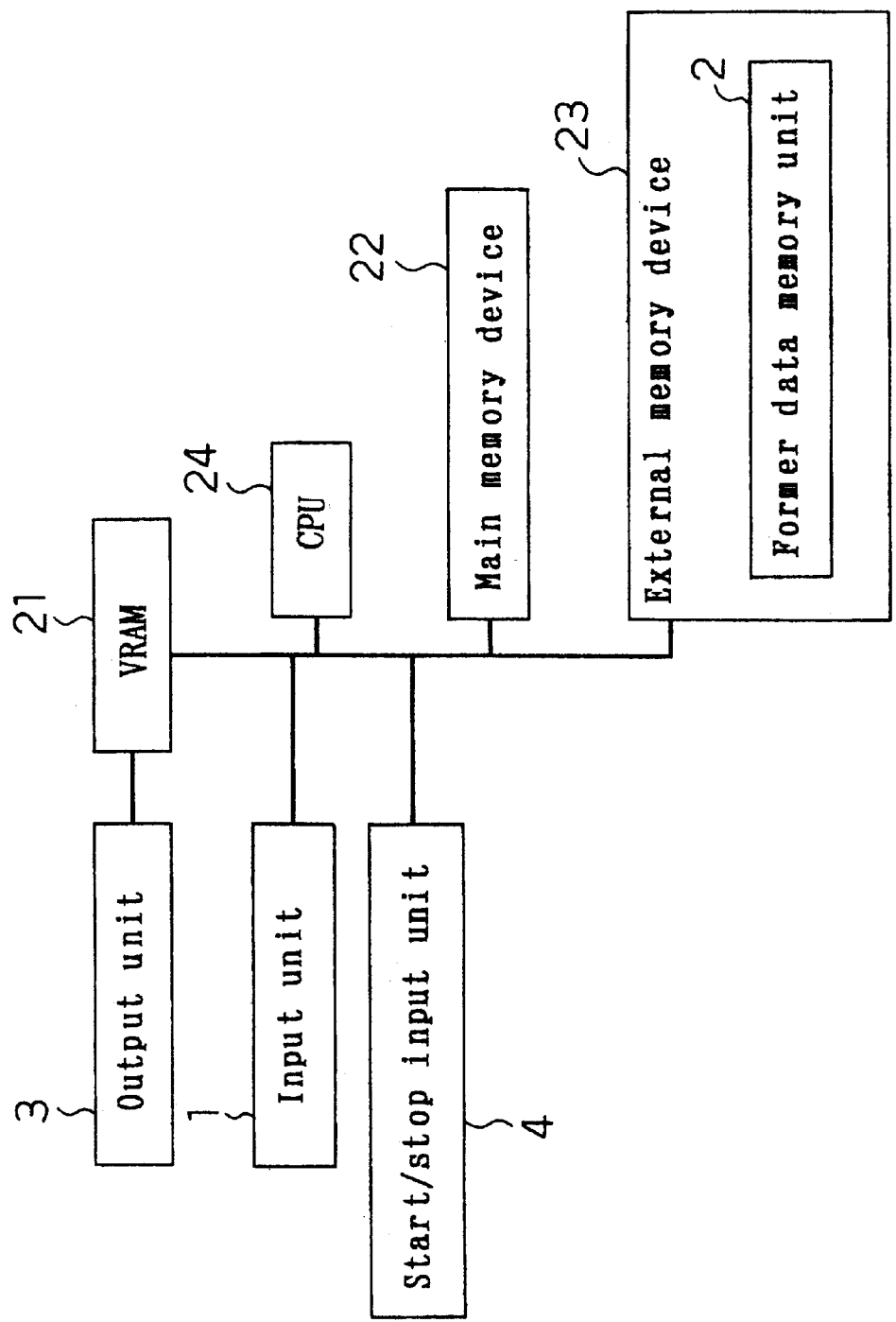
FIG. 2 is a hardware configuration diagram in the same embodiment.

A hardware configuration for executing the system thus constituted is shown in FIG. 2. FIG. 2 is basically same as the configuration of general-purpose computer system, and comprises the input unit 1, former data memory unit 2, output unit 3, and start/stop input unit 4 explained as constituent parts of the system configuration in FIG. 1. Of the constituent parts in FIG. 2, the same constituent parts as in the system configuration in FIG. 1 are identified with same reference numerals, and their explanations are omitted. In FIG. 2, reference numeral 21 is a VRAM for storing the data displayed in the output unit 3, 22 is a main memory device for storing program and data for processing at the time of execution, 23 is an external memory device for accumulating program and data, and 24 is a CPU for transferring the program stored in the external memory device 23 into the main memory device 22 and executing.

In thus constituted similar change information takeout method and similar change information takeout apparatus, the operation is described below while referring to the flowchart in FIG. 3. This flowchart is executed when designation of output of similar change information is entered from the start/stop input unit 4. The input from the start/stop input unit 4 is executed, for example, when the user pushes the buttons by preparing similar change information display start button and similar change information display stop button in the appliance.

When the user actually watches the teletext by using the apparatus of the embodiment, before pressing the similar change information display start button, once set in the ordinary mode as usual, the whole content of the teletext being broadcast at the present is displayed to understand the present broadcast content, and then this apparatus is started. Such operation is required in this embodiment because the character row data transmitted first after pressing the similar change information display start button is not displayed.

Figure 3:
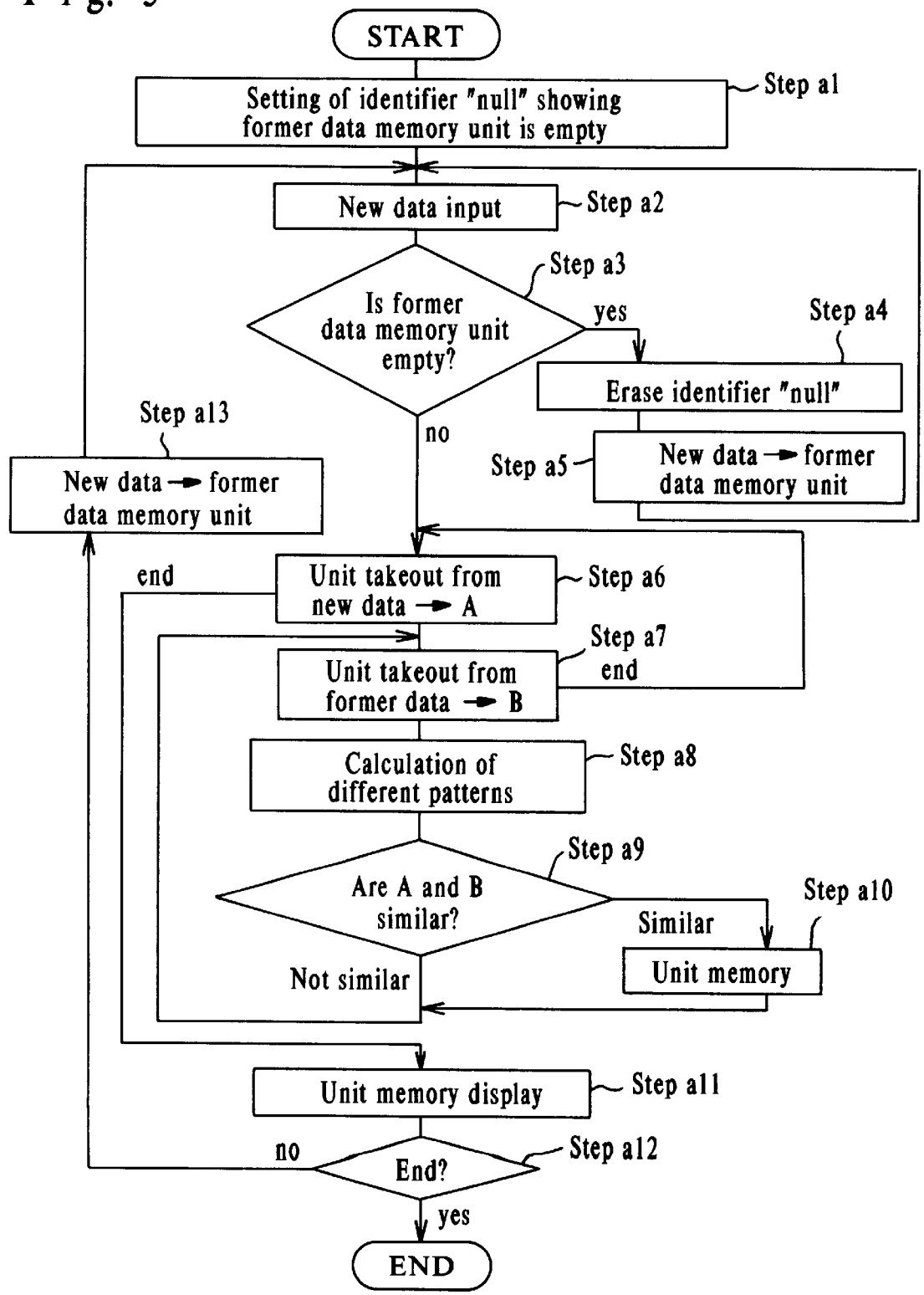
FIG. 3 is a flowchart showing operating procedure of the similar change information takeout method and similar change information takeout apparatus in the same embodiment.

In FIG. 3, when the similar change information display start button is pressed, at step a1, in the initializing process 5, an identifier showing that the former data memory unit 2 is empty is stored. For example, a character row "null" that can be distinguished from the input data is stored.

At step a2 to step a5, first in the data memory process 6, the character row data entered from the input unit 1 is accepted and stored as new data, and the content of the former data memory unit 2 is referred to, and as a result of reference, if "null" is stored in the former data memory unit 2, the identifier "null" is erased, and the input data is directly stored in the former data memory unit 2. Every time step a2 is executed, the data entering from the input unit 1 is stored again as new data. The data entered from the input unit 1 is the data divided into specified units as shown in FIG. 4.

In FIG. 4, there are n pieces of character row data divided into specified units. For example, contents of the newspaper containing information about sports are stored and entered from unit 1 to unit n in each press agency. In this example, the bulletin of the result of games of sports can be obtained by the similar change information takeout method and similar change information takeout apparatus. As the example used in the explanation of the following steps, the latest sports news is supposed to be entered in the format stored in unit 1 to unit n. An example of input data is shown in FIG. 5. This is prepared on the basis of the sports news of teletext being broadcast presently. In FIG. 5, each unit corresponds to the page of teletext.

At step a6, in the new data unit takeout process 7, one unit is taken out each from the new data stored at step a2, and is put into variable A for storing the unit. When taking out one unit from new data, for example, according to the predetermined sequence such as input order, one is taken out every time this step is called. In this process, however, even if the unit is taken out from the character row data stored as new data, the unit being take out is not erased from the memory. After taking out all units sequentially by repeating step a6, the process advances to step a11 as indicated by "end" in the flowchart. For example, when data shown in FIG. 5 is entered, "null" is stored in the former data memory unit, and the data is stored in the former data memory unit at step a5, and when step a2 is executed again after executing step a5, it is supposed that the data in FIG. 6 is entered. In this case, since the data in FIG. 6 is stored as new data, for example, unit 1 in FIG. 6 is taken out at this step.

At step a7, one unit is taken out from the former data memory unit 2, and is put into variable B for storing the unit. When taking out one unit from the former data memory unit 2, for example, according to the predetermined sequence such as data input order, one is taken out every time this step is called. In this process, however, even if the unit is taken out from the former data memory unit 2, the unit being take out is not erased from the memory. After taking out all units sequentially by repeating step a7, the process advances to step a6 as indicated by "end" in the flowchart. For example, when data shown in FIG. 5 is stored in the former data memory unit, one unit in FIG. 5 is taken out at this step.

At step a8, in the unit comparison process 8, similarity is compared between two units A and B. When comparing the similarity, the characters contained in unit A and unit B are compared sequentially. At this time, when characters are different, any one of the difference patterns shown in Table 1 is judged according to the type of the character.

TABLE 1

| Difference pattern | Condition of difference pattern |
| --- | --- |
| Kanji difference | Characters taken out from A and B are both kanji. |
| Katakana difference | Characters taken out from A and B are both katakana. |
| Numeral difference | Characters taken out from A and B are both numerals. |

TABLE 1-continued

| Difference pattern | Condition of difference pattern |
| --- | --- |
| Hiragana difference | Characters taken out from A and B are both hiragana. |
| Blank, kanji difference | Of characters taken out from A and B, one is blank and other is kanji. |
| Blank, katakana difference | Of characters taken out from A and B, one is blank and other is katakana. |
| Blank, numeral difference | Of characters taken out from A and B, one is blank and other is numeral. |
| Blank, hiragana difference | Of characters taken out from A and B, one is blank and other is hiragana. |
| Other difference | Other combination |

For example, suppose unit 1 in FIG. 6 is put in unit A, and unit 1 in FIG. 5 in unit B.

In this case, the first character is blank in both unit A and unit B, and characters are not different. For the next character "2" of "横浜 FO-" in the third line of unit A, the subject of comparison is the next character "0" of "横浜 FO-" in the third line of unit B, and these two characters are different from each other, corresponding to numeral difference of the difference patterns in Tabled 1.

At step a8, thus judging the difference pattern, the number is calculated in the different character and type count process 9. For example, as a result of comparison of unit A and unit B, the number of each difference pattern is calculated, such as (number of kanji differences, number of katakana differences, number of numeral differences, number of hiragana differences, number of blank, kanji differences, number of blank, katakana differences, number of blank, numeral differences, number of blank, hiragana differences, and number of other differences) =(10, 0, 5, 0, 0, 0, 0, 0, 0). For example, if unit A is unit 3 in FIG. 6 and unit B is unit 2 in FIG. 5, the contents are identical, and different character is not detected as a result of comparison, and thereby (number of kanji differences, number of katakana differences, number of numeral differences, number of hiragana differences, number of blank, kanji differences, number of blank, katakana differences, number of blank, numeral differences, number of blank, hiragana differences, and number of other differences)=(0, 0, 0, 0, 0, 0, 0, 0, 0).

At step a9, similarity is judged between unit A and unit B according to the difference patterns calculated at step a8, in the similarity judging process 10, and when judged to be similar, the process advances to step a10, and if not judged to be similar, the process returns to step a7. In the similarity judgement, first if the calculation result of difference patterns is (number of kanji differences, number of katakana differences, number of numeral differences, number of hiragana differences, number of blank, kanji differences, number of blank, katakana differences, number of blank, numeral differences, number of blank, hiragana differences, and number of other differences)=(0, 0, 0, 0, 0, 0, 0, 0, 0), unit A and unit B are matched completely, and it is judged not similar. If not matched completely, assuming the average of the number of characters contained in unit A and unit B to be H, specific constants t1, t2, t3, t4, t5, t6, t7, t8, t9 are determined, thereby calculating G=number of kanji differences×t1+number of katakana differences×t2+number of numeral differences×t3+number of hiragana differences× t4+number of blank, kanji differences×t5+number of blank, katakana differences×t6+number of blank, numeral differences×t7+number of blank, hiragana differences×t8+ number of other differences×t9. As compared with the result of calculation, if G/H is smaller than the predetermined threshold, it is judged to be similar, and otherwise it is not judged to be similar. The constants t1, t2, t3, t4, t5, t6, t7, t8, t9 express the degree of difficulty of appearance of each difference pattern in the unit containing similar change information, and a larger value is set for the constant corresponding to the difference pattern that is less likely to appear. In the similar change information of sport bulletin, the fighting partners are not changed until the end of the game, but the score changes moment by moment. Accordingly, it is judged that the kanji difference is least likely to appear, and a large value is set for the constant t1 corresponding to the kanji difference, while the numeral difference is judged to appear often, and a small value is set for the constant t3 corresponding to the numeral difference. On the other hand, katakana is used in the team name of the sport, same as kanji, in the similar change information, and the constant t2 corresponding to the katakana difference is set large same as t1. Hiragana is also used in the team name of the sort, same as kanji and katakana, in similar change information, and therefore the constant t4 corresponding to the hiragana difference is also set large same as t1 and t2. Concerning the constants corresponding to the number of blank, kanji differences, number of blank, katakana differences, number of blank, numeral differences, and number of blank, hiragana differences, in the similar change information, there are fighting table data before start of the game, and the blank may be filled with such information as the winning trick of sumo and the result of soccer game, and hence t5, t6, t7, t8 are set larger than t3 and smaller than t1, t2, t4. Such example of setting relates to sports bulletin transmitted in teletext, and it is necessary to set depending on the nature of the input data.

For example, supposing unit 1 in FIG. 6 to be unit A and unit 1 in FIG. 5 to be unit B, "2" and "0", "鴨", and "前", and "池" and, "半" of the third line, "2" and "0", "平", and "前" and "塚" and "半" of the fourth line, "2" and "0", "草" and "前" and "薙" and "半" of the fifth line, "鵯" and "前" and "田" and "半" of the sixth line, and "1" and "0", "3" and "1", "方" AND "前" AND "博" and "半" of the seventh line are different, and hence (number of kanji differences, number of katakana differences, number of numeral differences, number of hiragana differences, number of blank, kanji differences, number of blank, katakana differences, number of blank, numeral differences, number of blank, hiragana differences, and number of other differences)=(10, 0, 5, 0, 0, 0, 0, 0, 0). In this case, supposing the number of characters of one unit to be 147 characters, and (t1, t2, t3, t4, t5, t6, t7, t8, t9)=(5, 5, 1, 5, 3, 3, 2, 3, 5), hence H=147, G=10×5+0× 5+5×1+0×5+0×3+0×3+0×2+0×3+0×5=55, resulting in G/H=0.374. When the threshold is set at 0.5, these two units are judged to be similar. Actually, in this example, unit 1 in FIG. 6 and unit 1 in FIG. 5 are regarded to be similar units. That is, unit 1 in FIG. 5 is regarded to be followed by unit 1 in FIG. 6, which may be hence assumed to be similar change information. In this method, moreover, in comparison between unit 3 in FIG. 6 and each unit in FIG. 5, for example, unit 2 in FIG. 5 is matched perfectly, and it is not judged to be similar, and other units are larger than 0.5 in the value of G/H, and hence are not regarded to be similar.

At step a10, when unit A and unit B are judged to be similar to each other at step a9, unit A is stored. The storing place may be either on the external memory device 23 or on the main memory device 22. For example, when unit 1 in FIG. 5 and unit 1 in FIG. 6 are judged to be similar, unit 1 in FIG. 6 which is put in unit A is stored. By repeating the operation of steps a6 to a10, the units judged to be similar are sequentially stored in the memory device.

At step a11, the unit stored at step a10 in the unit output process 11 is displayed in the output unit 3.

Figure 7:
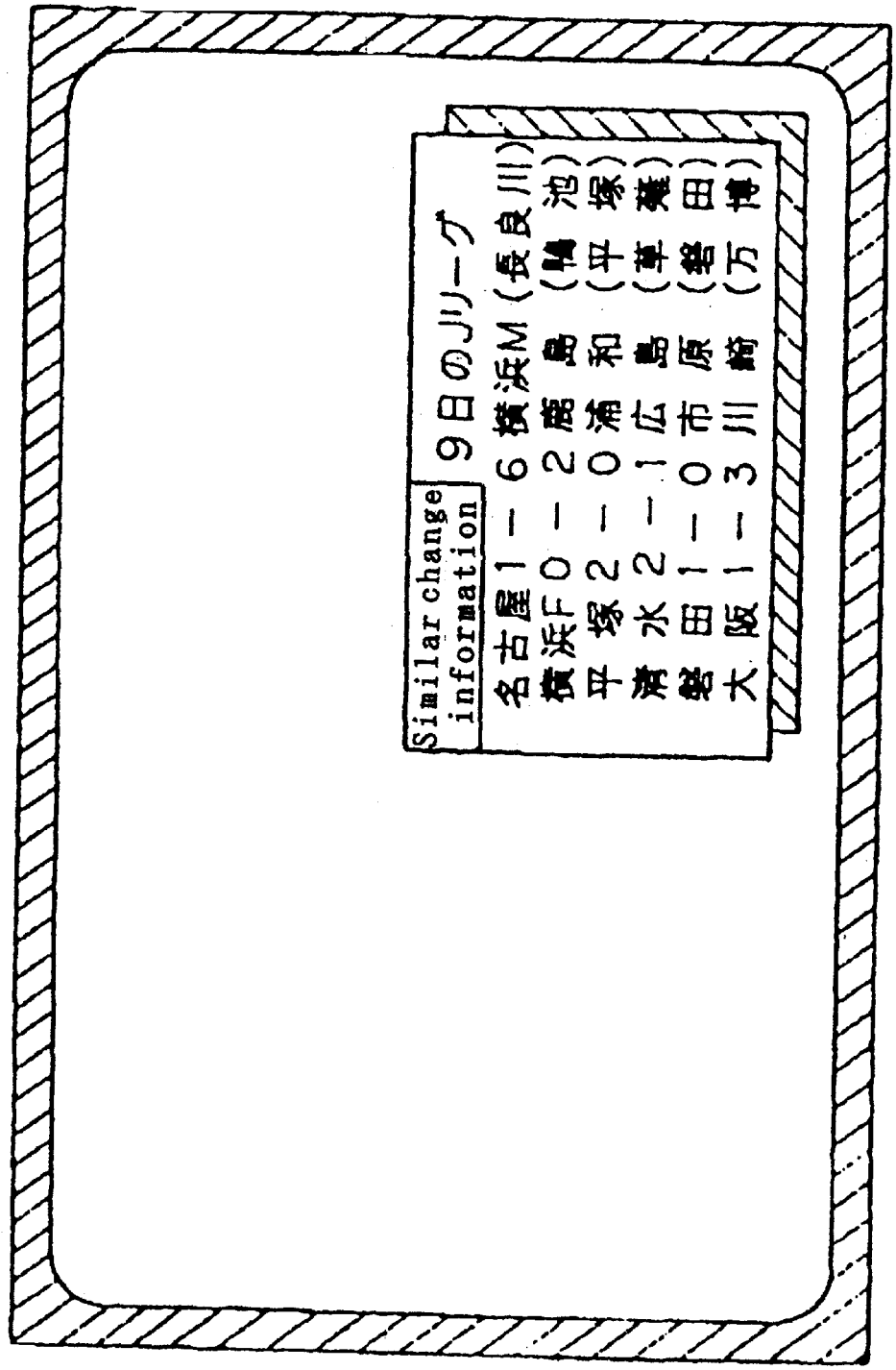
FIG. 7 is a diagram showing an output example in the same embodiment.

For example, when unit 1 in FIG. 6 is stored at step a10, as shown in FIG. 7, this unit 1 is displayed. Actually, however, there may be a plurality of units containing similar change information. In such a case, a scroll bar may be attached to the display area of the similar change information in FIG. 7, or a button for viewing next page may be prepared, and every time the user selects the button, the units containing similar change information may be displayed one after another. When displaying the information, it may be also considered to issue user's caution alerting sound such as beep sound and alarm sound.

At step a12, it is judged if the input for stopping display of similar change information given by the user through the start/stop input unit 4, and if the stopping input is made, processing is terminated, and if stopping input is not made, the process advances to step a13. This input from the user is supposed to be stored in the buffer of the start/stop input unit 4. That is, if the user makes an input while doing other process than step a12, it is stored, and it can be judged at this step.

At step a13, in the data update process 12, a character row data stored as new data is transferred to the former data memory unit 2. For example, when the data shown in FIG. 6 is stored as new data, this data is transferred to the former data memory unit 2, and the process advances to step a2. That is, the content of the former data memory unit 2 is updated by the transferred new data. By advancing to step a2, the newly entered data is stored again as new data. At this time, as explained at step a10, the content of the memory unit storing the unit judged to be similar is also cleared.

The first embodiment of the first aspect of the invention is applied in a different example below. In this example, instead of the Japanese data shown in FIG. 5, English data is entered as shown in FIG. 26. Similarly, as the data entered in the time series, the data changing in content is entered by time delay as shown in FIG. 27.

The operation of this example is described while referring to the flowchart in FIG. 3.

At step a1 to step a7, processing is same as in the Japanese data processing except that the input data is written in English.

At step a8, in the unit comparison process 8, similarity is compared between unit A and unit B. When comparing the similarity, the characters contained in unit A and unit B are compared sequentially. At this time, if characters are different, any one of the difference patterns shown in Table 2 is judged according to the type of character.

TABLE 2

| Difference pattern | Condition of difference pattern |
| --- | --- |
| Alphabet difference | Characters taken out from A and B are both alphabetic letters. |
| Numeral difference | Characters taken out from A and B are both numerals. |
| Blank, alphabet difference | Of characters taken out from A and B, one is blank and other is alphabetic letter. |
| Blank, numeral difference | Of characters taken out from A and B, one is blank and other is numeral. |
| Other difference | Other combination |

For example, unit 2 in FIG. 27 is put in unit A, and unit 2 in FIG. 26 in unit B. In this case, the first character is blank in both unit A and unit B, and hence the characters are not different. Comparing sequentially, for the next character "7" of "Braves 1" of the second line in unit A, the next character.

"6" of "Braves 1–" of the second line of unit B is the subject of comparison, and these characters are different from each other, corresponding to the numeral difference in the difference patterns in Table 2.

At step a8, the difference pattern is thus judged, and the number is counted in the different character and type count process 9. For example, as a result of comparison of unit A and unit B, the number of each difference pattern is determined as follows: (number of alphabet differences, number of numeral differences, number of blank, alphabet differences, number of blank, numeral differences, and number of other differences)=(0, 3, 0, 0, 0). When units coinciding perfectly are compared, the result is (number of alphabet differences, number of numeral differences, number of blank, alphabet differences, number of blank, numeral differences, and number of other differences)=(0, 0, 0, 0, 0).

At step a9, in the similarity judging process 10, similarity of unit A and unit B is compared on the basis of the difference pattern detected at step a8. In the judgement of similarity, same as when handling Japanese data, first, when the calculation result of difference patterns is (number of alphabet differences, number of numeral differences, number of blank, alphabet differences, number of blank, numeral differences, and number of other differences)=(0, 0, 0, 0, 0), unit A and unit B are perfectly matched, and they are judged to be not similar. If not matched perfectly, supposing the average of the number of characters contained in unit A and unit B to be H, specific constants t1, t2, t3, t4, t5 are determined, and the following is calculated: G=number of alphabet differences×t1+number of numeral differences×t2+ number of blank, alphabet differences×t3+number of blank, numeral differences×t4+number of other differences×t5. As a result of calculation, if G/H is smaller than a predetermined threshold, it is judged to be similar, and otherwise it is judged not similar. The constants t1, t2, t3, t4, t5 express the degree of difficulty of appearance of each difference pattern in the unit containing bulletin information same as in the case of handling Japanese data, and a larger value is set for the constant corresponding to the difference pattern that is less likely to appear. In the bulletin information of sport bulletin, the fighting partners are not changed until the end of the game, but the score changes moment by moment. Accordingly, it is judged that the alphabet difference is least likely to appear, and a large value is set for the constant t1 corresponding to the alphabet difference, while the numeral difference is judged to appear often, and a small value is set for the constant t2 corresponding to the numeral difference. In such setting example, meanwhile, it is necessary to set depending on the nature of the input data same as in the case of handling Japanese data.

For example, supposing unit 2 in FIG. 27 to be unit A and unit 2 in FIG. 26 to be unit B, "7" and "6" of the second line, "4" and "2" of the fifth line, and "c" and "S", "1" and "n", "1" and blank, "e" and "D", "d" and "i", blank and "e", "o" and "g", "f", and "o", "f" and ")", and ")" and blank of the seventh line are different, and hence (number of alphabet differences, number of numeral differences, number of blank, alphabet differences, number of blank, numeral differences, and number of other differences)=(6, 2, 2, 0, 2). In this case, supposing the number of characters of one unit to be 280 characters, and (t1, t2, t3, t4, t5)=(5, 1, 2, 1, 5), hence H=280, G=6×5+2×1+2×2+0×1+2×5=46, resulting in G/H=0.164. When the threshold is set at 0.5, these two units are judged to be similar. Actually, in this example, unit 2 in FIG. 27 and unit 2 in FIG. 26 are regarded to be similar units. That is, unit 3 in FIG. 26 is regarded to be followed by unit 2 in FIG. 27, which may be hence assumed to be bulletin information. In this method, moreover, in comparison between unit 4 in FIG. 27 and each unit in FIG. 26, for example, unit 4 in FIG. 26 is matched perfectly, and it is not judged to be similar, and other units are larger than 0.5 in the value of G/H, and hence are not regarded to be similar.

At step a10, when unit A and unit B are judged to be similar to each other at step a9, unit A is stored. The storing place may be either on the external memory device 23 or on the main memory device 22. For example, when unit 2 in FIG. 26 and unit 2 in FIG. 27 are judged to be similar, unit 2 in FIG. 27 which is put in unit A is stored.

Figure 28:
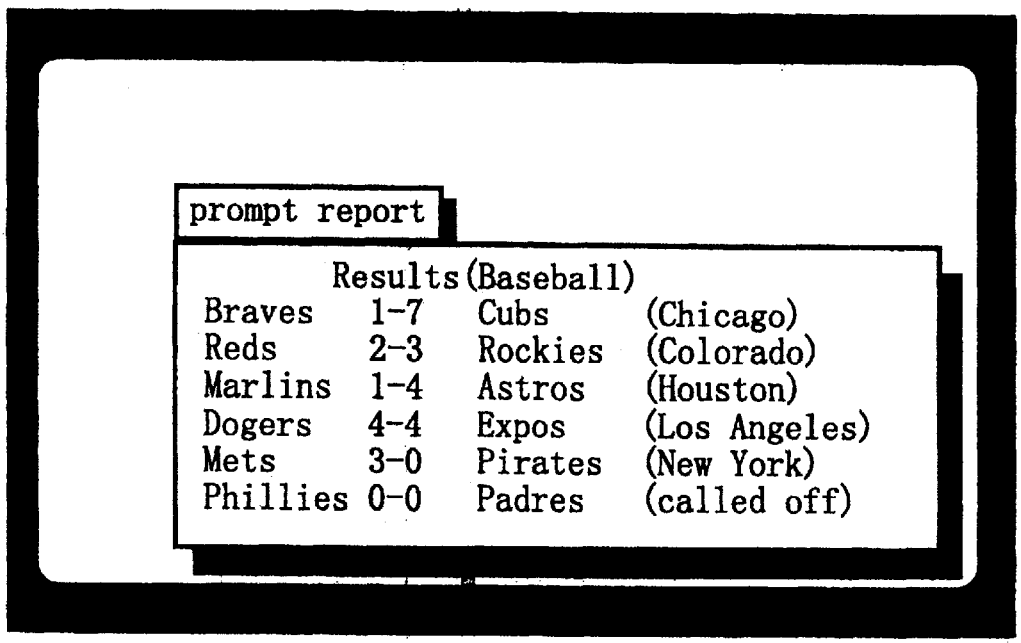
FIG. 28 is a diagram showing an output example in the first embodiment of the first aspect of the invention.

At step a11, the unit stored at step a10 in the unit output process 11 is displayed in the output unit 3. For example, when unit 2 in FIG. 27 is stored at step a10, as shown in FIG. 28, the unit is displayed. Actually, however, there may be a plurality of units containing bulletin information. In such a case, a scroll bar may be attached to the display area of the bulletin information shown in FIG. 28, or a button for viewing next page may be prepared, and every time the user selects the button, the units containing bulletin information may be displayed one after another. When displaying the information, it may be also considered to issue user's caution alerting sound such as beep sound and alarm sound.

The processing at step a12 and step a13 is same as in the process on the Japanese data.

Herein, the display in the output unit 3 is described more specifically below by referring to FIG. 5 to FIG. 7.

In this embodiment, as described above, the first entered character row data shown in FIG. 5 are not displayed. Therefore, there is a possibility that the character row data which are transmitted sequentially in time series having a certain time interval after the first entered character row data shown in FIG. 5 are transmitted are displayed.

As described above, in FIG. 7, from the result of judgement of similarity between the character row data shown in FIG. 5 and character row data shown in FIG. 6, it shows that the unit 1 shown in FIG. 6 is displayed in the output unit 3 as similar change information.

Such display in the output unit 3 continues from the time of output of the unit judged to have similarity to the output unit 3 by the unit output means 11 until next new character row data is sent after a specific interval.

When next new character row data is sent and the unit taken out as similar change information is displayed, beep sound or the like is issued to tell it to the use.

As a result, the user knows that the displayed data is updated. If the immediately preceding character row data and the new character row data are exactly same in content, there is no unit taken out as similar change information, and hence nothing is issued to the output unit 3 by the unit output means 11. In this case, therefore, character row data is not displayed in the output unit 3 until the next new character row data is further sent forth.

Incidentally, the timing of disappearance of the display of similar change information in the output unit 3 is, in the above case, the time when the next new character row data is sent forth, but instead, for example, the display may be erased at the fastest moment, that is, before the next new character row data is sent forth. In this case, immediately before the character row data is sent, there is a state of no display whether similar change information is present or absent.

On the other hand, a different display method from the above display method may be possible as described below.

That is, when the immediately preceding character row data and new character row data are exactly same in content, there is no output of similar change information to the output unit 3 from the unit output means 11 as mentioned above. In this case too, however, the output unit 3 does not erase the existing display, and hence the display continues. Thus displayed unit is displayed continuously until a new unit similar to this unit is later issued from the unit output means 11. More specifically, the display in the display unit 3 keeps the state shown in FIG. 7 until the content of the unit 1 shown in FIG. 6 is changed.

This method of display also solves the conventional problems of necessity of searching of unit containing changing information from multiple units. However, even the unit small in frequency of change, if once judged as similar change information, is not erased from the display in the output unit 3. By contrast, in the former method of easing the display at the specified timing, only the unit having similar change in comparison with the character row data always sent immediately before is displayed, so that display of the unit small in frequency in change is avoided.

As the manner of display, therefore, the former method is preferable to the latter method.

The same holds true in the output unit 3 in the following embodiments.

(Embodiment 2)

A second embodiment is described below while referring to the drawings.

The second embodiment presents a teletext receiver applying the similar change information takeout method.

Figure 8:
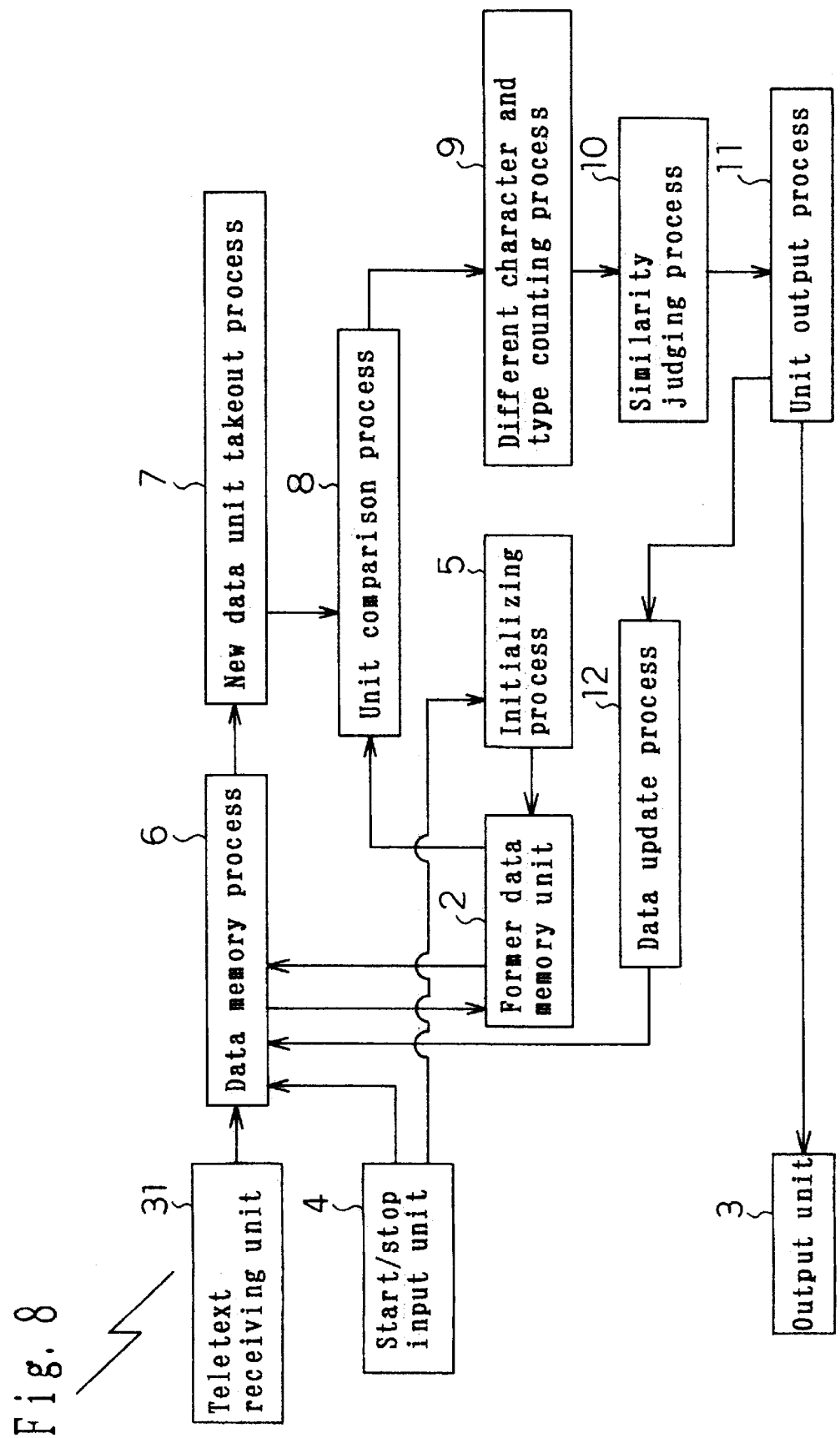
FIG. 8 is a block diagram showing a system configuration of teletext receiver in a second embodiment of the first aspect of the invention.

FIG. 8 is a system configuration diagram of the second embodiment. In FIG. 8, what differs from the system configuration of the first embodiment shown in FIG. 1 that a teletext receiving unit 31 is provided instead of the input unit 1. Other constituent parts are same as in the system configuration of the first embodiment, and are hence identified with same reference numerals and explanations are omitted.

Figure 9:
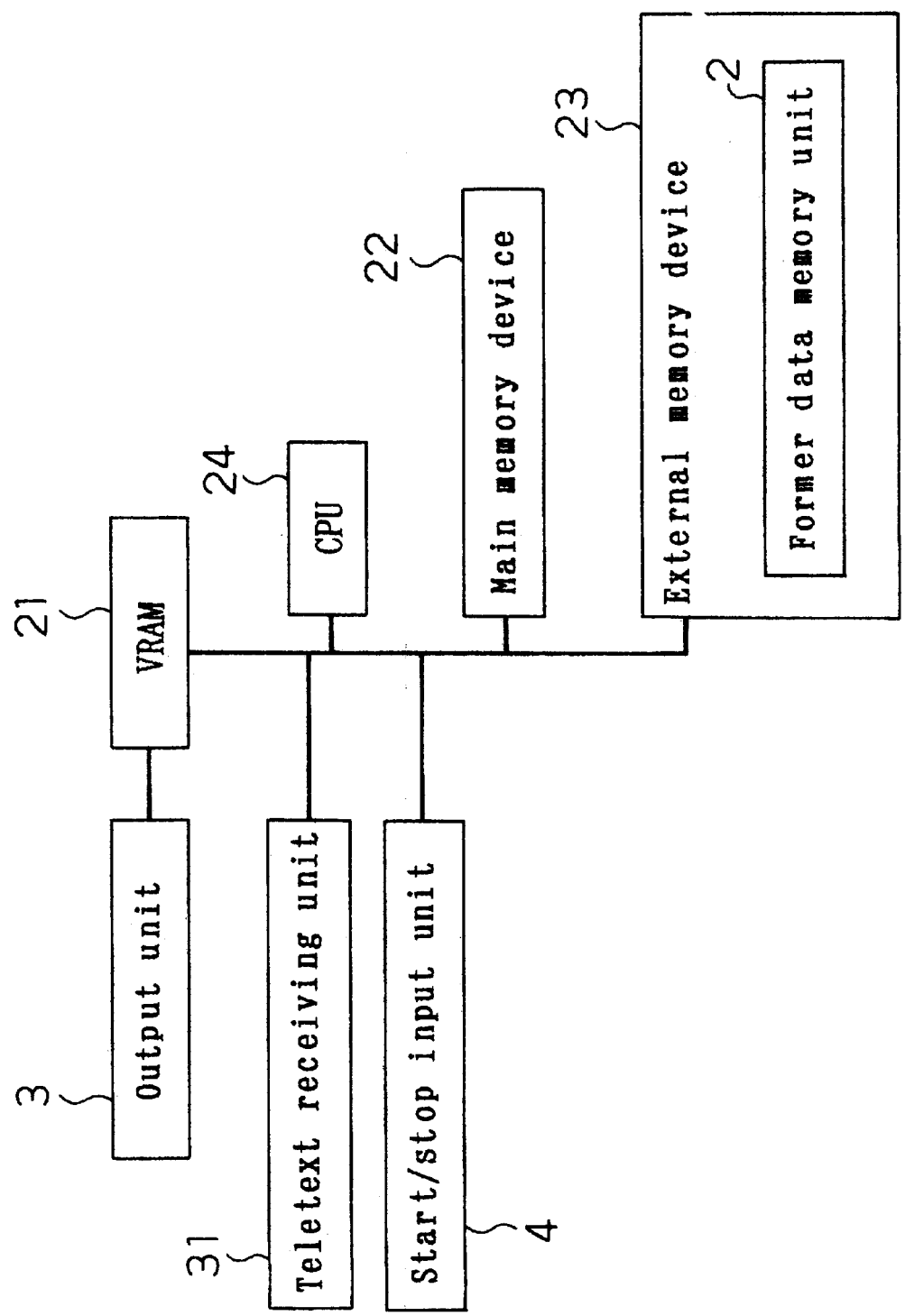
FIG. 9 is a hardware configuration diagram in the same embodiment.

The hardware structure for executing thus constituted system is shown in FIG. 9. The hardware structure in FIG. 9 consists of the constituent parts of the system configuration shown in FIG. 8 and the constituent parts of the hardware structure of the first embodiment shown in FIG. 2, and same constituent parts are identified with same reference numerals and explanations are omitted.

The teletext receiving unit 31 is for receiving teletext programs, and a received program is, for example, an existing teletext program, which is divided into pages of a specific length. Accordingly, what is handled as the unit in the first embodiment is replaced by the page in the program.

Other processing is same as the process in the flowchart shown in FIG. 3. Therefore, of the flow chart in FIG. 3, the data entered from the input unit 1 at step a2 is received from the teletext receiving unit 31. At steps a6 to a11, the portion handled as the unit is replaced by the page.

The data examples shown in FIGS. 5 and 6 presented in the first embodiment relate to the data on the basis of the program broadcast by teletext, and the intermediate processing example and output example are both same as in the first embodiment. Thus, when applied in the teletext receiver, in the television provided with function of receiving teletext, only the similar change information can be displayed in the slave screen as shown in the output example in FIG. 7.

Incidentally, if English data as shown in FIGS. 26 and 27 is sent as the content of teletext, processing is done same as in the processing of English data explained in the first embodiment.

(Embodiment 3)

A third embodiment is described below while referring to the drawings.

The third embodiment relates to similar change information takeout method and similar change information takeout apparatus.

Figure 10:
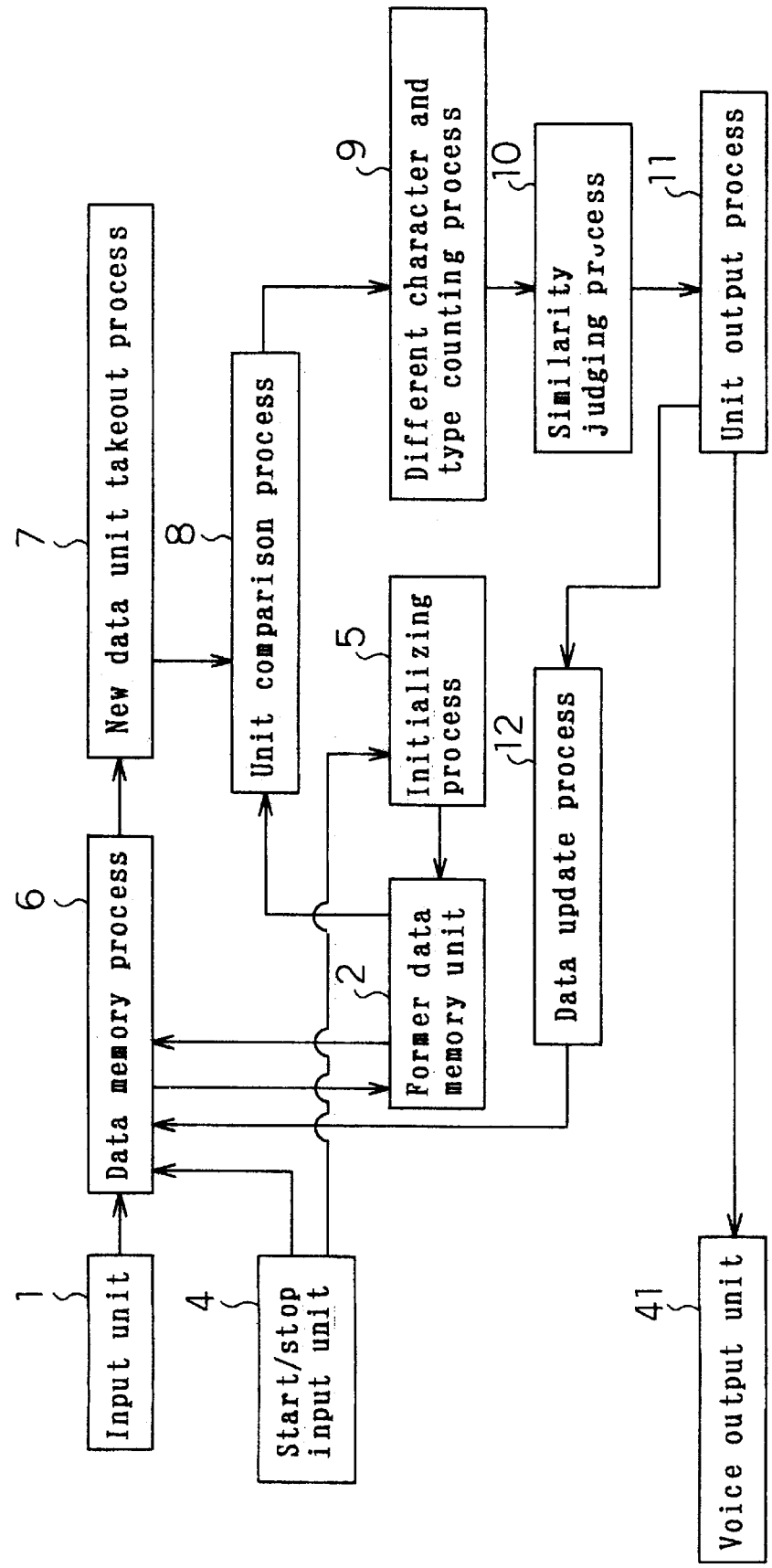
FIG. 10 is a block diagram showing a system configuration of similar change information takeout method and similar change information takeout apparatus in a third embodiment of the first aspect of the invention.

FIG. 10 is a system configuration diagram of the third embodiment. In FIG. 10, what differs from the system configuration of the first embodiment shown in FIG. 1 is that a voice output unit 41 is provided instead of the output unit 3. Other constituent parts are same as in the system configuration of the first embodiment, and are hence identified with same reference numerals and explanations are omitted.

Figure 11:
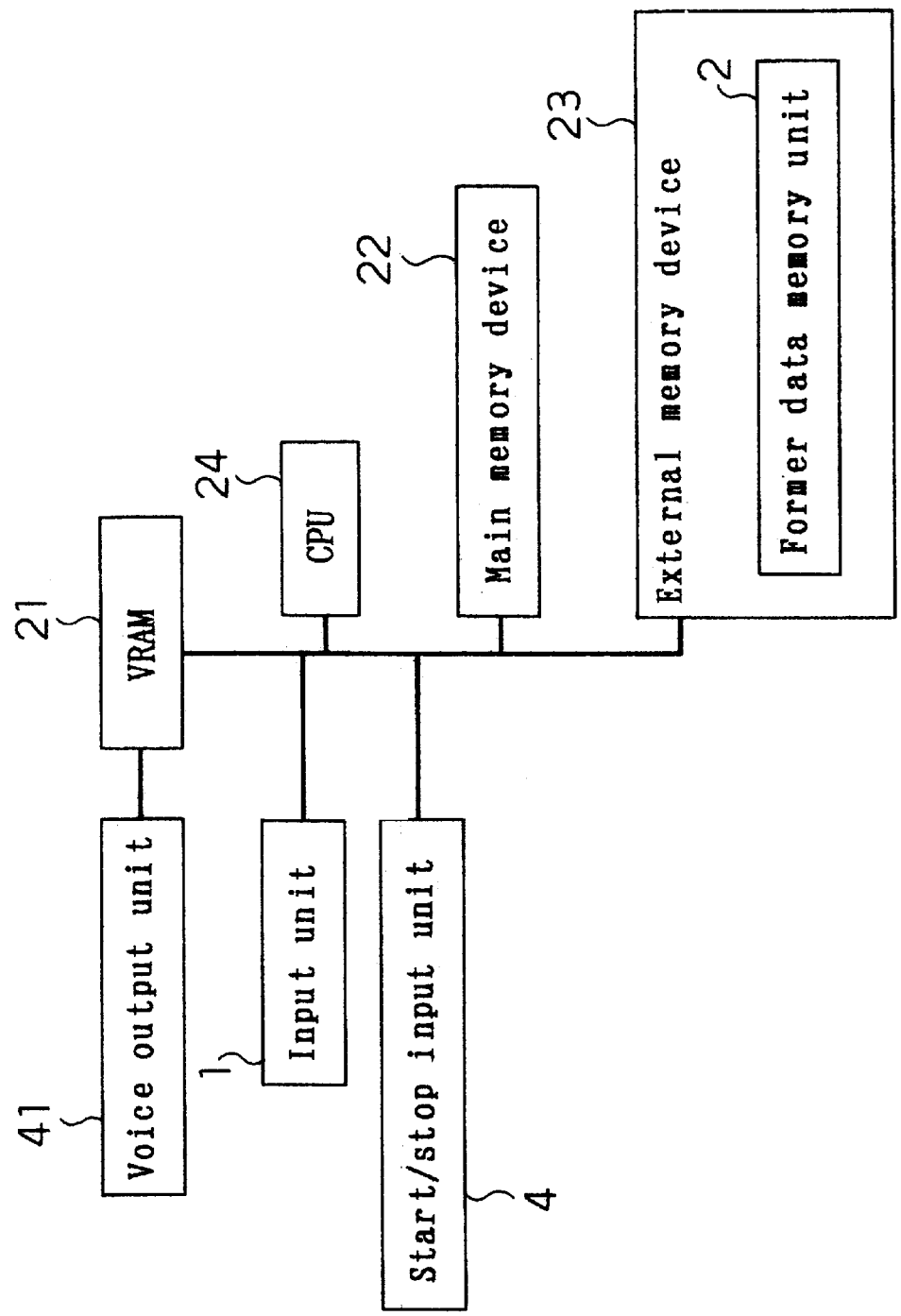
FIG. 11 is a hardware configuration diagram in the same embodiment.

The hardware structure for executing thus constituted system is shown in FIG. 11. The hardware structure in FIG. 11 consists of the constituent parts of the system configuration shown in FIG. 10 and the constituent parts of the hardware structure of the first embodiment shown in FIG. 2, and same constituent parts are identified with same reference numerals and explanations are omitted.

The voice output unit 41 converts the unit to be outputted in the unit output process 11 into voice, and outputs. The data to be outputted in the unit output process 11 is given as character row data. Accordingly, the character codes must be sequentially converted into voice. As the method of converting into voice, various methods have been hitherto proposed, and any method may be employed in the invention.

This embodiment is basically same in operation as the first embodiment shown in FIG. 3. What differs is that, instead of the memory unit display at step a11, the unit stored at step a10 is converted and outputted as voice.

In this embodiment, the input unit 1 is contained in the system configuration, but it may be replaced by the teletext receiving unit 31. In this case, receiving the teletext, only the page containing the similar change information is taken out, and converted to voiced and presented to the user.

In the voice output unit 41, it is also possible to convert the English data shown in FIGS. 26 and 27 into voice and output. For such technique, various methods have been developed hitherto as the voice synthesizing technique. Therefore, in the same method as the processing of English data shown in the first embodiment, it is possible to process when the English data is entered or received also in this embodiment.

In this invention, in any embodiment, regardless of the unit or page containing similar change information, if once taken out, whether the same content is entered or received, it is not judged to be similar in the similarity judging process 10. For example, if the newly transmitted character row data is identical in content with the character row data transmitted immediately before, it is not judged to be similar in the similarity judging process 10.

Accordingly, the similarity judging means 10 does not take out the unit or page containing the similar change information, until the content is updated, in comparison with the immediately preceding character row data. Therefore, only when change is found by continuously monitoring the similar change information, the information is taken out from the output unit 3 in the first embodiment and second embodiment, or the voice output unit 41 in the third embodiment.

Hence in the first embodiment or second embodiment, when outputting information, it may be considered to deliver a caution alerting sound such as beep sound and alarm sound in the output unit 3. It is therefore possible to draw attention by beep sound or the like only when the similar change information is updated, by taking out and displaying the similar change information by the invention in, for example, a mobile appliance with teletext receiving function. Accordingly, without having to observe the screen continuously while driving, the progress of the game of the sport can be known by watching the screen only when updated.

Moreover, by converting and outputting as voice as in the third embodiment, the progress of the game can be known by the voice, without having to move the vision to the screen while driving an automobile.

Hitherto, while driving, there was known a method of learning the progress of sport game by listing to the live broadcast through the radio, but for the user wanting to know only the progress of the game, there were following problems: 1) the broadcast of the entire game must be monitored, 2) the desired game is not always broadcast, and 3) while listening to the radio, the voice is continuously issued from the radio, which makes it hard to listen to the music comfortably by the car audio.

In the teletext program, on the other hand, the progress of all games is broadcast, in principle, and it is noticed by voice only when there is a change in the process of the game according to the third embodiment of the invention, so that the above problems may be solved.

In all embodiments of the invention, the constituent parts may be may be composed in the software or in the hardware. Moreover, the first embodiment, second embodiment, and third embodiment may be combined.

(Embodiment 4)

A fourth embodiment is described by reference to the drawings.

Figure 12:
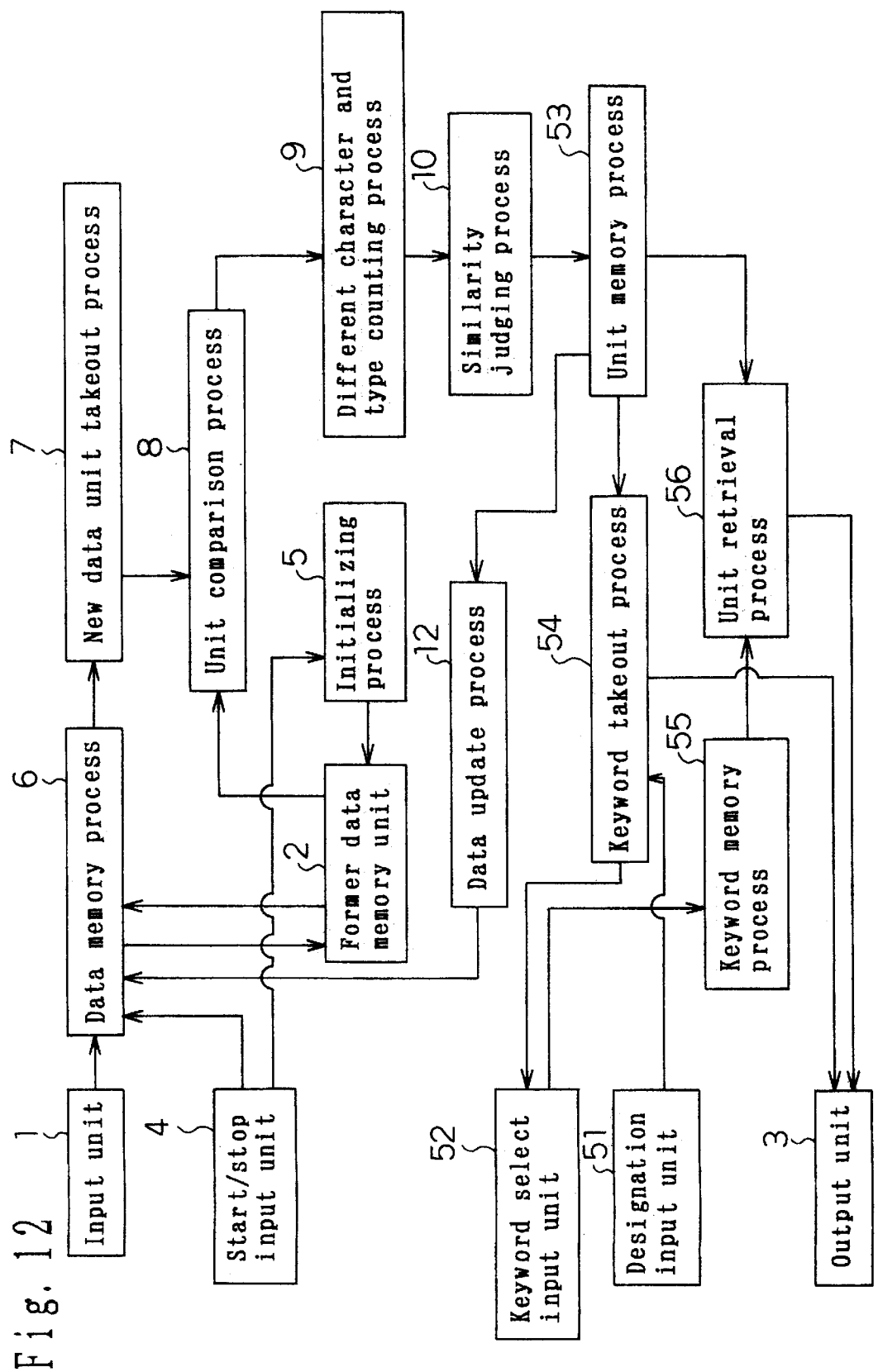
FIG. 12 is a block diagram showing a system configuration of similar change information takeout method and similar change information takeout apparatus in a first embodiment of a second aspect of the invention.

The fourth embodiment shows a takeout method of similar change information. FIG. 12 is a system configuration diagram of the fourth embodiment. In FIG. 12, there are same constituent parts as in the system configuration of the first embodiment shown in FIG. 1, and they are identified with same reference numerals and their explanations are omitted. Only the parts different from the system configuration of the first embodiment of the first aspect of the invention are described. Reference numeral 51 is a designation input unit to be entered by the user when desired to manipulate for input of keyword for designating the similar change information, 52 is a keyword select input unit for accepting the selection of keyword from the user, 53 is a unit memory process for storing the unit judged to be similar in the similarity judging process 10 as the unit containing similar change information, 54 is a keyword takeout process for cutting out the keyword from the unit stored in the unit memory process 53 if there is an input by the user from the designation input unit 51, and displaying in the output unit 3, 55 is a keyword memory process for storing the result of selection as keyword by accepting the keyword selection by the user in the keyword select input unit 52, and 56 is a unit retrieval process for retrieving the unit containing the user keyword from the unit stored in the unit memory process 53, regardless of presence or absence of input from the designation input unit 51, and outputting in the output unit 3.

Figure 13:
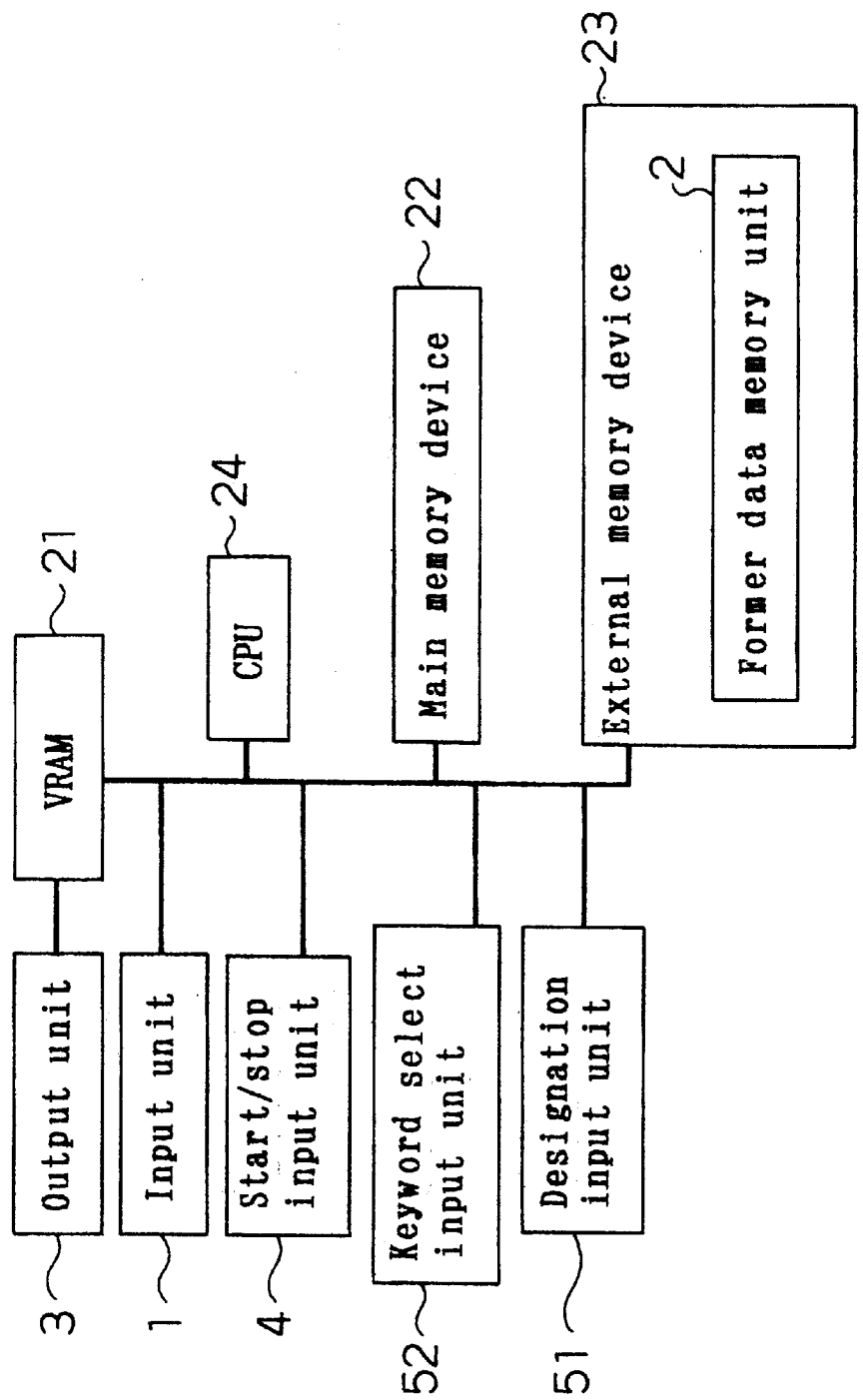
FIG. 13 is a hardware configuration diagram in the same embodiment.

The hardware structure for executing thus constituted system is shown in FIG. 13. FIG. 13 is basically same as the constitution of the general-purpose computer system, and consists of the constituent parts of the hardware structure of the first embodiment of the first aspect of the invention shown in FIG. 2 and the constituent parts of the system configuration of the fourth embodiment shown in FIG. 12, and same constituent parts are identified with same reference numerals and explanations are omitted.

In thus constituted similar change takeout method and similar change takeout apparatus, the operation is described below while referring to the flowchart in FIG. 1 4. This flowchart is executed when designation of output of similar change information is entered from the start/stop input unit 4. The input from the start/stop input unit 4 is given as the user presses the buttons by preparing, for example, similar change information display start button and similar change information display stop button in the appliance.

Step b1 to step b10 correspond to the process of step a1 to step a10 in the flowchart of FIG. 3 explained in relation to the operation of the first embodiment of the first aspect of the invention. In the unit memory at step b10, however, as compared with the first embodiment, since the retrieval process about the stored unit is conducted at a later step, and hence it is done in the unit memory process 53 as an explicit process for memory.

At step b11, it is judged if there is any input expressing the will of the user for selecting a keyword for designating the desired similar change information (hereinafter called user keyword) from the designation input unit 41. As a result of judgement, if there is an input, the process advances to step b12, and if there is no input, the process skips to step b15. In this embodiment, when the user desires to select the user keyword, the user is supposed to designate by pressing the bulletin keyword button. For example, in an appliance furnished with a remote controller such as television, a push button may be prepared in the remote controller and is used as the bulletin keyword button. Or in an appliance furnished with GUI (graphic user interface) such as personal computer, a button or an iron on the screen that can be selected by pointing device such as mouse is prepared and used as bulletin keyword button.

At step b12, in the keyword takeout process 54, the keyword is cut out from the unit stored at step b10. Concerning the manner of cutting out the keyword from the unit given as character row, various methods have been proposed hitherto in the natural language processing technology, and any method may be employed. Considering, however, that it is actually difficult in the case of dictionary information or the like requiring a large scale of memory capacity, and also that there are too many proper nouns to prepare dictionary information in the case of news or sports information, this embodiment is intended to cut out the keyword on the basis of the difference in the type of character without using dictionary information. More specifically, one or more continuous characters of kanji, hiragana, alphabet or katakana are cut out. Depending on the similar change information to be entered, however, those not cut out as keyword are determined preliminarily, and they are exempted from the subject of cutting out when cutting out the keyword. For example, in the case of handling of similar change information of sports, 1) the unit designations following numerals such as the "回(inning)", "(points)", "節(season)", "回表(top of inning)", "回裏(bottom of inning)", "日(day)", and "月(month)", and 2) specific words about sports bulletin such as "前半(first half)", "後半(second half)", "試合(game)", "Jリーグ(J-League)", and "プロ野球(professional baseball)" are excluded from the subjects of cutting out keyword. Besides, space between characters of kanji, hiragana, alphabet and katakana is ignored, and only one character of hiragana being cut out is also ignored. For example, from 巨人3-2 阪神,三回表(Giants 3-2 Hanshin, the top of the third inning) only 巨人(Giants) and 阪神(Hanshin) are cut out. The keywords being cut out from the unit 1 shown in FIG. 5 are 三回表,横浜,横浜,鹿島,平塚,浦和,清水,広島,磐田,市原,大阪,川崎.

On the other hand, when handling English data as shown in FIGS. 26 and 27, as an example of cutting out, a word may be cut out from the boundary of symbols such as "(", ")", ":", ",", and ";" in addition to the space. Depending on the similar change information to be entered, however, those not to be cut out as keyword and characters excluded from keyword are determined beforehand. For example, only numerals without including alphabetic letters are not cut out, and cut-out keywords including "("or ")" are excluded from keywords. From unit 2 shown in FIG. 26, for instance, the following words are cut out: Result, Baseball, Braves, Cubs, Chicago, Reds, Rockies, Colorado, Marlins, Astros, Houston, Dodgers, Expos, Los, Angeles, Mets, Pirates, New, York, Phillies, Padres, San, and Diego.

Figures 15, 16:
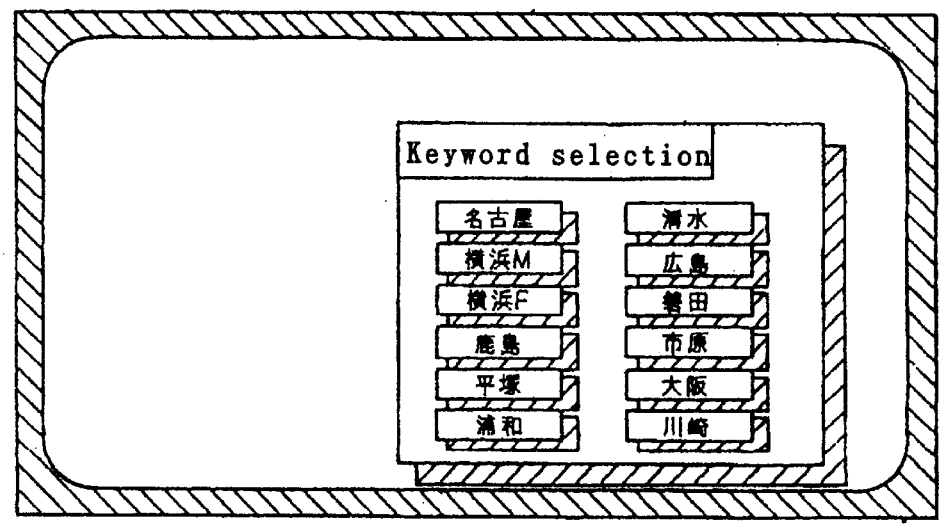
FIG. 15 is a diagram showing an output example in the same embodiment.
FIG. 16 is a diagram showing an example of unit contained in the input data in the same embodiment.

At step b13, the keyword being cut out at step b12 is displayed in the output unit 3, and the user selects the user keyword in the key word select input unit 52. In the example shown at step b12, the cut-out keywords are displayed as shown in FIG. 15, and the user can select a desired keyword on the screen by using a pointing device such as cross key and mouse. The keyword selecting method is not particularly limited, including conventional selecting techniques such as the method of selecting numeral button by assigning each keyword with numeral. Moreover, many units may be stored at step b10, and it may be difficult to display all of them on one screen, and therefore a scroll bar may be attached to the keyword display area in FIG. 15, or a button for viewing next page may be prepared, so that the keyword list may be scrolled every time the user selects the button.

When handling English data as shown in FIGS. 26 and 27, keywords are presented, for example, as shown in FIG. 29.

At step b14, in the keyword memory process 55, the keyword designated by the user at step b13 is stored. The storing place may be either main memory device 22 or external memory device 23. When stored on the main memory device 22, the user keyword must be set again every time this similar change information takeout function is started up, but it is free from effects of previous setting. When the user keyword is stored on the external memory device 23, when this similar change information takeout function is newly started, the previously set use keyword can be used. In this embodiment, suppose it is stored on the main memory device 22. At this time, to store the user keyword, if the previously stored user keyword exists, it is erased, and only the new one is stored. Of course, the new one may be added to the previously stored one.

At step b15, it is judged if the user keyword is set at step b14 or not. In this embodiment, the user keyword is initialized to a state of nothing set at the time of start of the flowchart in FIG. 14. This initializing method may be realized, same as in the prior art, by a method of setting an identifier expressing blank. Incidentally, when the user keyword is stored in the external memory device 23 at step b14, an identifier showing nothing is set is preliminarily set on the external memory device as initial value, and once the user keyword is updated at step b14, the value is used as initial value.

At step b16, in the unit memory process 56, a unit containing the user keyword is searched, out of the units containing the similar change information stored at step b10. The searching method is a general method employed hitherto. That is, while comparing character by character sequentially, a unit containing a same array of characters as the user keyword is searched. In matching processing between character rows, however, the space contained between characters is ignored. Therefore, the user keywords 大阪 and 大阪 are regarded as identical character row. For example, if the user keyword is set as 大阪, as explained in relation to the first embodiment of the first aspect of the invention, if unit 1 in FIG. 9 is stored as the unit containing similar change information at step a10 (step b10 in this embodiment), this unit is searched at step b16 as the unit containing the user keyword OSAKA.

When handling English data as shown in FIGS. 26 and 27, suppose the user selects "Dodgers" as the user keyword at step b13, out of choices shown in FIG. 29. In this case, if unit 2 shown in FIG. 27 is stored as the a mit containing the similar change information at step b10, this unit is searched as the unit containing the user keyword "Dodgers" at step b16.

At step b17, the unit searched at step b16 is displayed in the output unit 3. In this example, unit 1 in FIG. 6 is searched, and hence the display example is same as in FIG. 7. In the first embodiment, however, when plural units containing similar change information are stored at step a10 (step b10 in this embodiment), all are displayed. By contrast, in this embodiment, if 大阪 is set as the user keyword, for example, when other units shown in FIG. 16 are stored as units containing similar change information aside from unit 1 in FIG. 6, only unit 1 in FIG. 6 is searched and displayed at step b16.

When handling English data as shown in FIGS. 26 and 27, if "Dodgers" is set as the user keyword, when units as shown in FIG. 30 are stored as units containing similar change information, only unit 2 in FIG. 27 is searched and displayed at step b16.

At step b18 to step b19, of the flowchart in FIG. 3 explained in the first embodiment of the first aspect of the invention, same processing as in step a12 to step a13 is conducted.

As explained in this embodiment, of character row data, first units changing similarly are searched, and the unit containing the user keyword is selected from the plural searched units, but not limited to this operation, first the unit containing the user keyword may be selected from the character row data, and then units changing similarly may be selected from the plural searched units. This constitution comprises input means in which character row data divided in specified units is entered in time series, first memory means for storing the first entered character row data out of character row data entered in time series, second memory means for storing the later entered character row data out of the character row data entered in time series, comparing and judging means for selecting units containing an entered keyword when comparing matching point and/or different point of the character row data of the first memory means and character row data of the second memory means, comparing in each unit between selected units, and judging presence or absence of similarity between the units of character row data to be compared on the basis of the result of comparison, output means for outputting the unit judged to have similarity out of the units in the second memory means when judged to have similarity by the comparing and judging means, and update control means for updating the content of the second memory by the new character row data entered from the input means by updating the content of the first memory means by the character row data of the second memory means after comparing and judging by the comparing and judging means.

(Embodiment 5)

A fifth embodiment is described below while referring to the drawings.

The fifth embodiment relates to a teletext receiver applying the similar change information takeout method.

Figure 17:
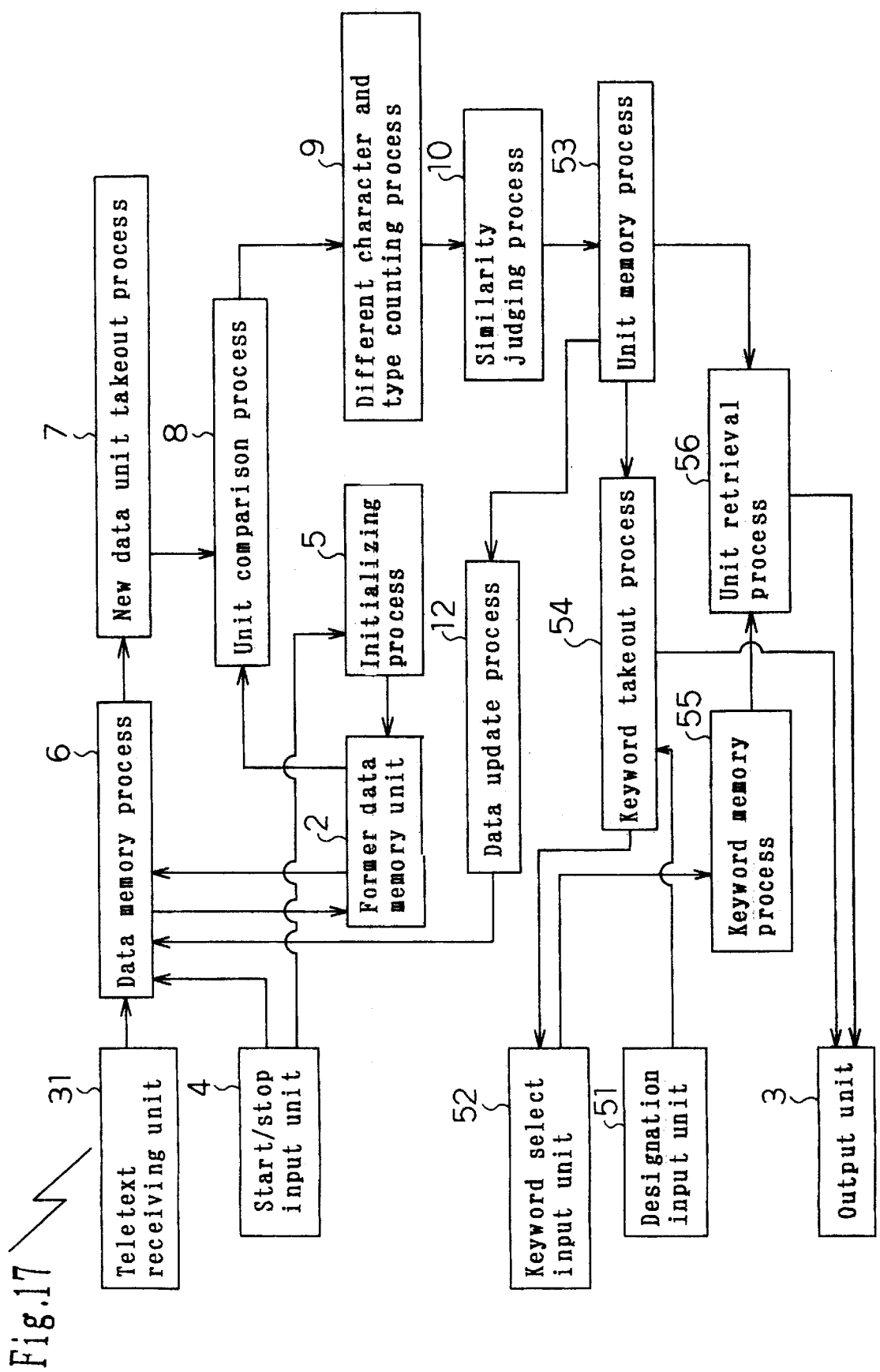
FIG. 17 is a block diagram showing a system configuration of teletext receiver in a second embodiment of the second aspect of the invention.

FIG. 17 is a system configuration diagram of the fifth embodiment. In FIG. 17, what differs from the system configuration of the first embodiment shown in FIG. 12 is that a teletext receiving unit 31 is provided instead of the input unit 1. Other constituent parts are same as in the system configuration of the first embodiment, and are hence identified with same reference numerals and explanations are omitted. Besides, the teletext receiving unit 31 shares in part with the constituent parts in FIG. 8 relating to the system configuration of the second embodiment of the first aspect of the invention, which are already explained in FIG. 8 and are hence omitted herein.

Figure 18:
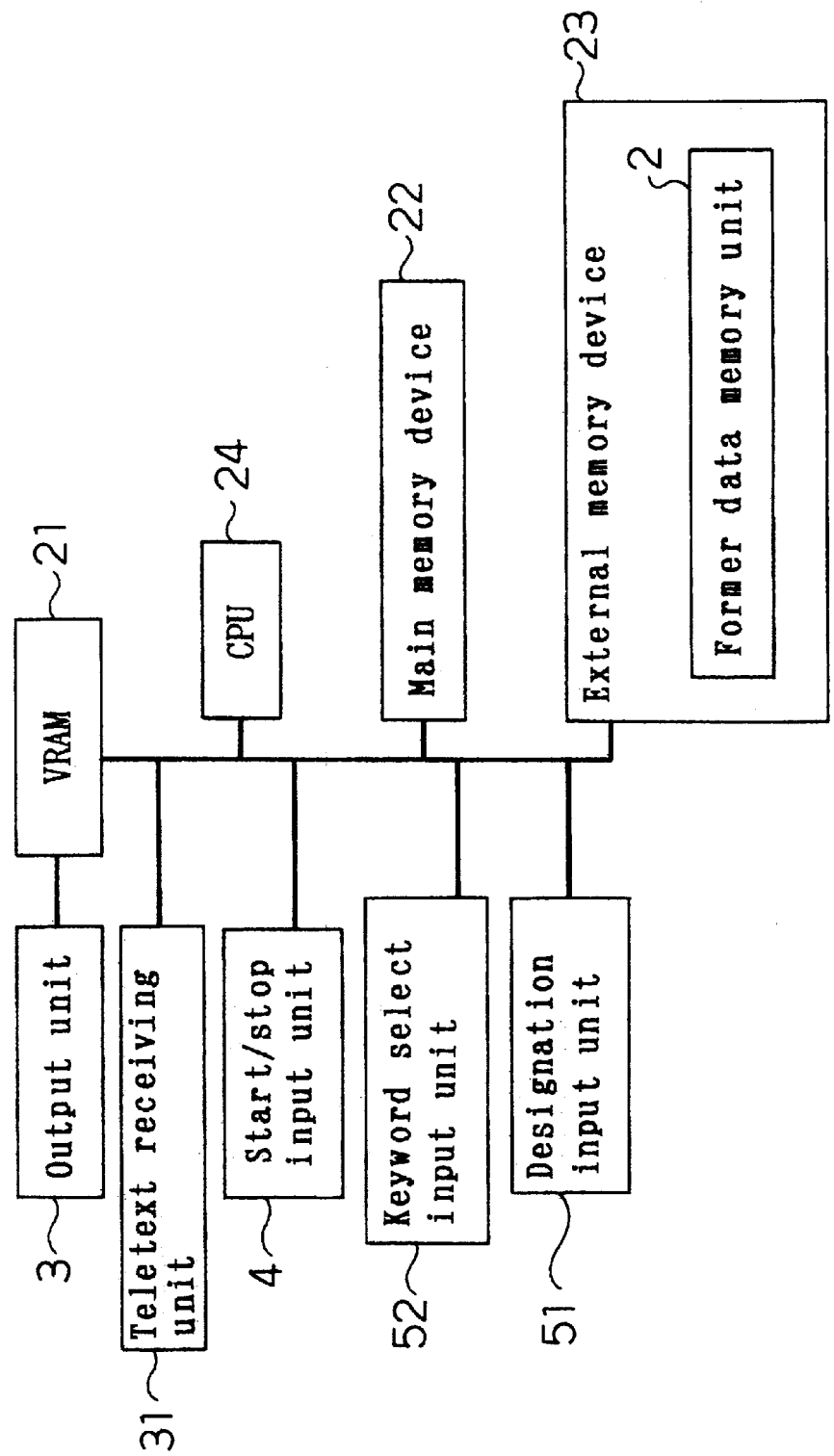
FIG. 18 is a hardware configuration diagram in the same embodiment.

The hardware structure for executing thus constituted system is shown in FIG. 18. The hardware structure in FIG. 18 consists of the hardware structure of the second embodiment of the first aspect of the invention shown in FIG. 9 and the constituent parts of the system configuration shown in FIG. 17, and same constituent parts are identified with same reference numerals and explanations are omitted.

In the fifth embodiment, the teletext program received in the teletext receiving unit 31 is divided into pages of specific length, and what is handled as the unit in the first embodiment is replaced by the page in the program. Other processing is same as the process in the flowchart shown in FIG. 14. The data examples shown in FIGS. 5 and 6 presented in the first embodiment relate to the data on the basis of the program broadcast by teletext, and the intermediate processing example and output example are both same as in the first embodiment.

Thus, when applied in the teletext receiver, in the television provided with function of receiving teletext, only the page containing the user keyword out of the pages containing similar change information can be displayed in the slave screen as shown in the output example in FIG. 7.

Incidentally, if English data as shown in FIGS. 26 and 27 is sent as the content of teletext, processing is done same as in the processing of English data explained in the fourth embodiment.

(Embodiment 6)

A sixth embodiment is described below by reference to the drawings.

The sixth embodiment relates to similar change information takeout method and similar change information takeout apparatus.

Figure 19:
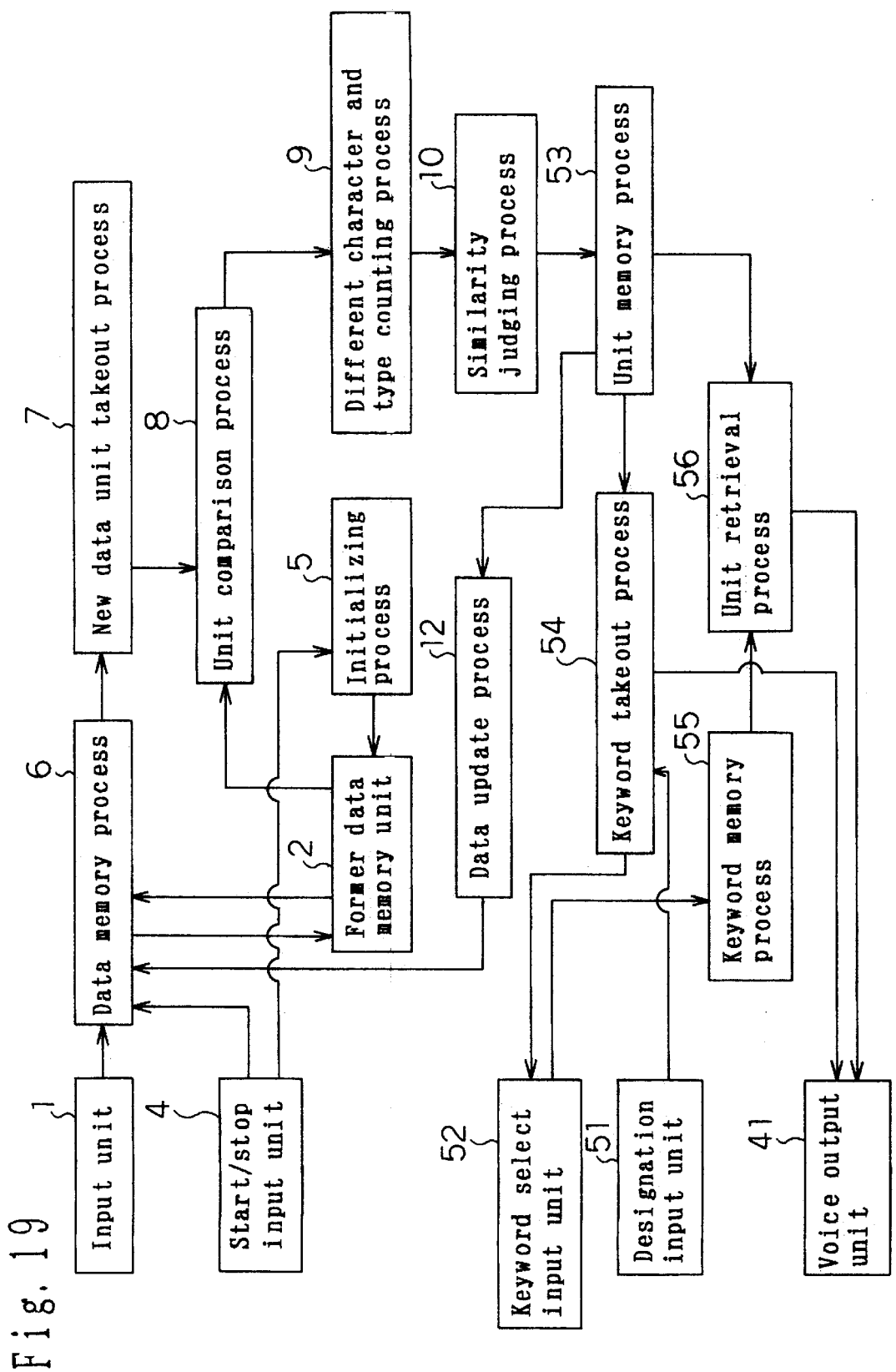
FIG. 19 is a block diagram showing a system configuration of similar change information takeout method and similar change information takeout apparatus in a third embodiment of the second aspect of the invention.

FIG. 19 is a system configuration diagram of the sixth embodiment. In FIG. 19, what differs from the system configuration of the fifth embodiment shown in FIG. 12 is that a voice output unit 41 is provided instead of the output unit 3. Other constituent parts are same as in the system configuration of the first embodiment, and are hence identified with same reference numerals and explanations are omitted.

Figure 20:
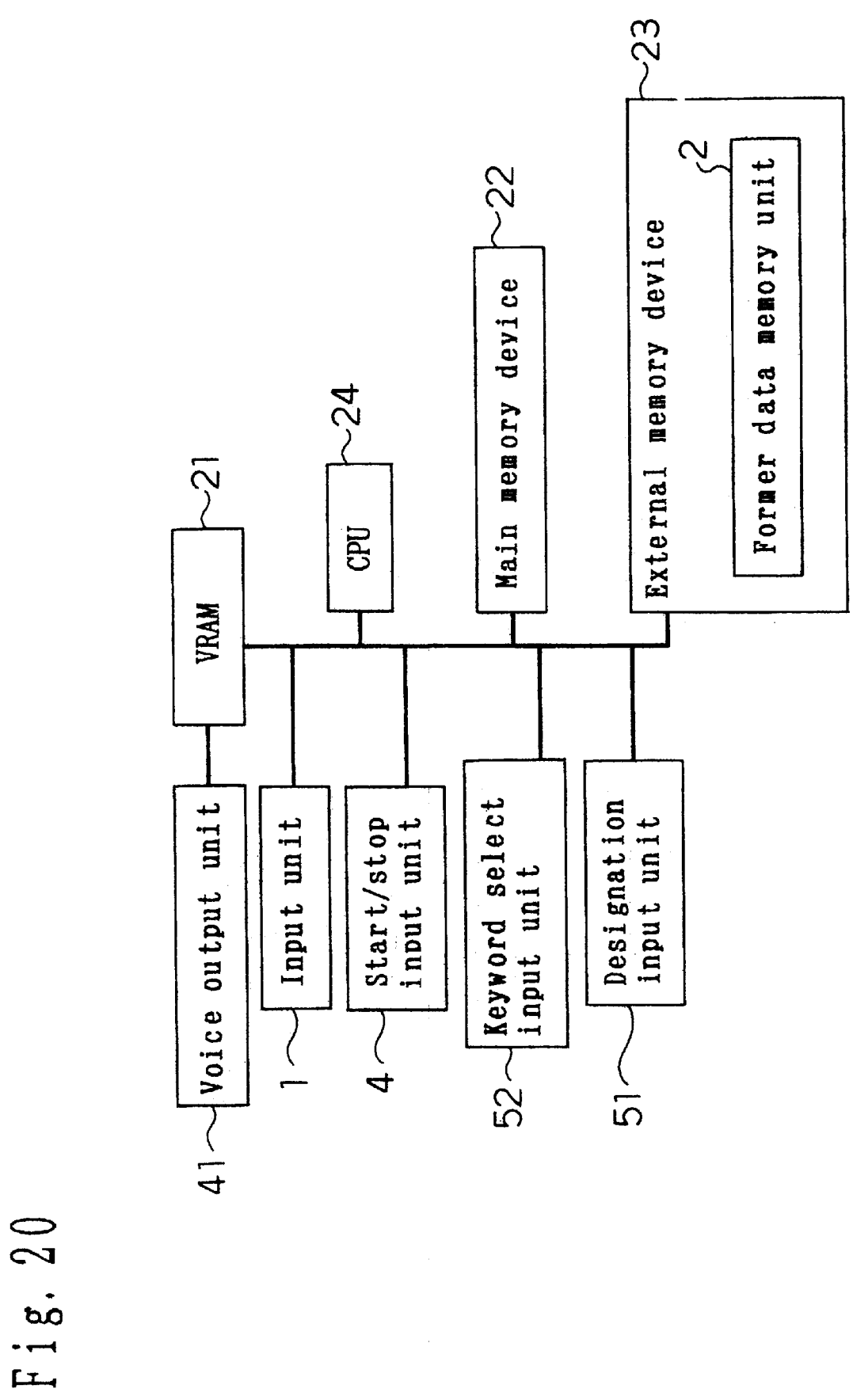
FIG. 20 is a hardware configuration diagram in the same embodiment.

The hardware structure for executing thus constituted system is shown in FIG. 20. The hardware structure in FIG. 20 consists of the constituent parts of the system configuration shown in FIG. 19 and the constituent parts of the hardware structure of the first embodiment shown in FIG. 13, and same constituent parts are identified with same reference numerals and explanations are omitted.

Figure 14:
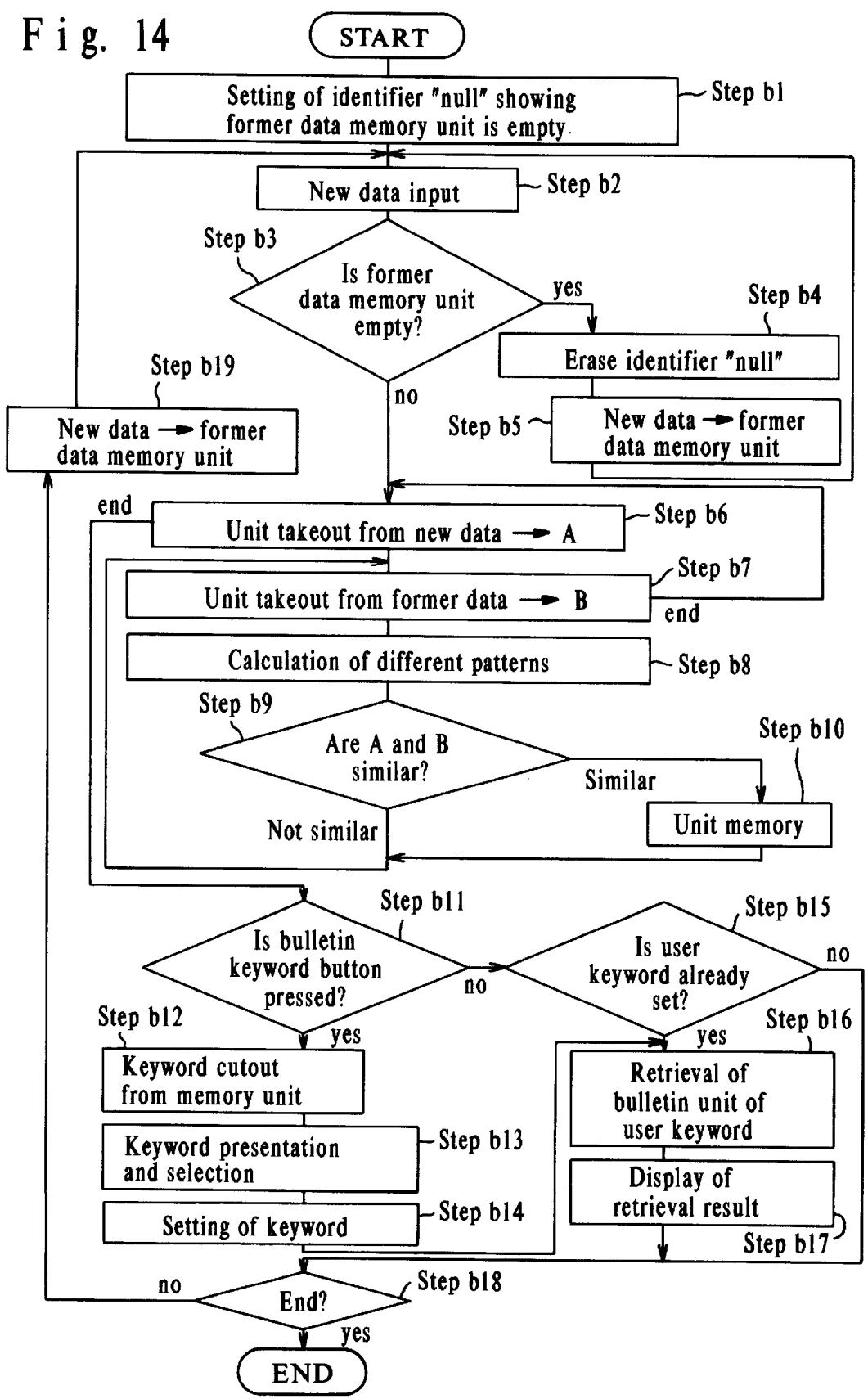
FIG. 14 is a flowchart showing operating procedure of the similar change information takeout method and similar change information takeout apparatus in the same embodiment.

The operation of the embodiment is basically same as the operation of the fourth embodiment shown in FIG. 14. What differs is that the unit searched at step b16 is converted into voice and outputted, instead of the search result display process at step b17. The unit searched at step b16 is character row data. Accordingly, the character codes must be sequentially converted into voice. As the method of converting into voice, various methods have been hitherto proposed, and any method may be employed in the invention.

In this embodiment, the input unit 1 is contained in the system configuration, but it may be replaced by the teletext receiving unit 31. In this case, receiving the teletext, only the page containing the similar change information is taken out, and converted to voiced and presented to the user.

In this invention, in any embodiment, regardless of the unit or page containing similar change information, if once taken out, whether the same content is entered or received, it is not judged to be similar in the similarity judging process 10. Accordingly, if once outputted, it is not taken out as the unit or page containing the similar change information, until the content is updated next. Therefore, only when change is found by continuously monitoring the similar change information, the information is outputted from the output unit 3 in the fourth embodiment and fifth embodiment, or the voice output unit 41 in the sixth embodiment. Hence in the fourth embodiment or fifth embodiment, when outputting information, it may be considered to deliver a caution alerting sound such as beep sound and alarm sound in the output unit 3.

It is therefore possible to draw attention by beep sound or the like only when the similar change information is updated, by taking out and displaying the similar change information by the invention in, for example, a mobile appliance with teletext receiving function. Accordingly, without having to observe the screen continuously while driving, the progress of the game of the sport contained in the unit or page designated, for example, by the user keyword can be known by watching the screen only when updated.

Moreover, by converting and outputting as voice as in the sixth embodiment, the progress of the game can be known by the voice, without having to move the vision to the screen while driving an automobile. Hitherto, while driving, there was known a method of learning the progress of sport game by listing to the live broadcast through the radio, but for the user wanting to know only the progress of the game, there were following problems: 1) the broadcast of the entire game must be monitored, 2) the desired game is not always broadcast, and 3) while listening to the radio, the voice is continuously issued from the radio, which makes it hard to listen to the music comfortably by the car audio. In the teletext program, on the other hand, the progress of all games is broadcast, in principle, and it is noticed by voice only when there is a change in the process of the game according to the sixth embodiment of the invention, so that the above problems may be solved. In all embodiments of the invention, the constituent parts may be may be composed in the software or in the hardware. Moreover, the fourth embodiment or fifth embodiment may be combined with the sixth embodiment.

In the voice output unit 41, it is also possible to convert the English data shown in FIGS. 26 and 27 into voice and output. For such technique, various methods have been developed hitherto as the voice synthesizing technique. Therefore, in the same method as the processing of English data shown in the fourth embodiment, it is possible to process when the English data is entered or received also in this embodiment.

(Embodiment 7)

A seventh embodiment is described below by reference to the drawings.

Figure 21:
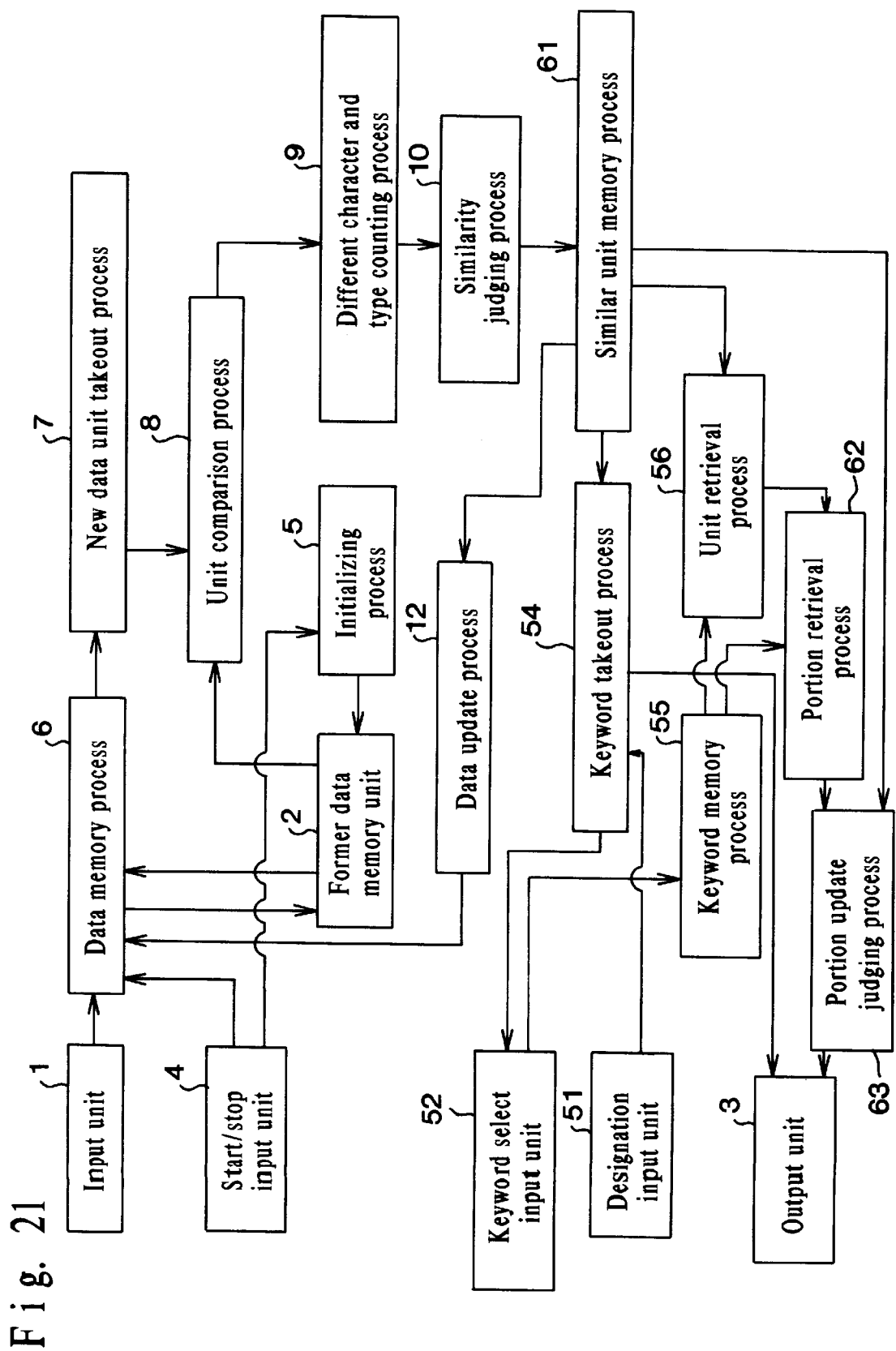
FIG. 21 is a block diagram showing a system configuration of similar change information takeout method and similar change information takeout apparatus in a first embodiment of a third aspect of the invention.

The seventh embodiment relates to similar change information take out method and similar change information takeout apparatus for taking out and display only the portion containing user keyword out of the units containing similar change information. FIG. 21 is a system configuration diagram of the seventh embodiment. FIG. 21 contains same constituent parts as in the fourth embodiment, and same constituent parts are identified with same reference numerals, and detailed description is omitted. In FIG. 21, what differs from the system configuration of the fourth embodiment shown in FIG. 12 is that it further comprises similar unit memory process 61 for storing both of two units judged to be similar to each other in the similarity judging process 10, portion retrieval process 62 for searching the portion containing the user keyword from the units searched in the unit retrieval process 56, and portion update judging process 63 for judging if the portion searched in the portion retrieval process 62 is updated or not. The portion retrieval means of the invention corresponds to the portion retrieval process 62, and the change judging process of the invention corresponds to the portion update judging process 63.

The hardware structure for executing thus constituted system is same as the hardware structure of the fourth embodiment shown in FIG. 14. Therefore, detailed description is omitted.

In thus constituted similar change information takeout method and similar change information takeout apparatus, the operation is described below while referring to the flowchart in FIG. 22. This flowchart is executed when designation of output of similar change information is entered from the start/stop input unit 4. The input from the start/stop input unit 4 is executed, for example, when the user pushes the buttons by preparing similar change information display start button and similar change information display stop button in the appliance.

Step c1 to step c9 is processed same as in step b1 to step b9 in the flowchart in FIG. 14 showing the operation of the first embodiment of the second aspect of the invention.

At step c10, in the similar unit memory process 61, unit A is stored as similar change information, and unit B is stored as former similar change information.

Step c11 to step c16 is processed same as in step b11 to step b16 in the flowchart in FIG. 14 showing the operation of the first embodiment of the second aspect of the invention.

At step c17, in the portion retrieval process 62, the line containing the user keyword is searched in the units containing similar change information searched at step c16 and in the units containing user keyword. For example, when unit 1 shown in FIG. 6 is the unit searched at step c16 and the user keyword is 大阪, the seventh line is searched. Or, in the case of handling English data as shown in FIGS. 26 and 27, suppose "Dodgers" is set as the user keyword. At this time, if the unit searched at step c16 is unit 2 in FIG. 27, the fifth line containing the user keyword "Dodgers" is searched. In this embodiment, meanwhile, the line containing the user keyword is searched, but other methods of retrieval may be also employed, such as searching of three lines before and after including the user keyword, and searching by the number of lines satisfying the predetermined conditions in the portion containing the user keyword.

At step c18, first from those stored as the former similar change information at step c10, units containing the user keyword are searched, and the portion containing the user keyword is selected from the searched units. These processes are same as in the method at step c16 and step c17. What differs from step c16 and step c17 is that step c16 and step c17 are intended to process on the units stored as similar change information at step c10, while it is intended herein to process on the units stored as former similar change information. Thus searched portion is compared with the portion searched at step c17 sequentially character after character, and if only one character is different, the process advances to step c19, or when all characters are identical, the process goes to step c20. The procedure so far is done in the portion update judging process 63.

At step c19, what is searched at step c18 is displayed in the output unit 3.

Figure 23:
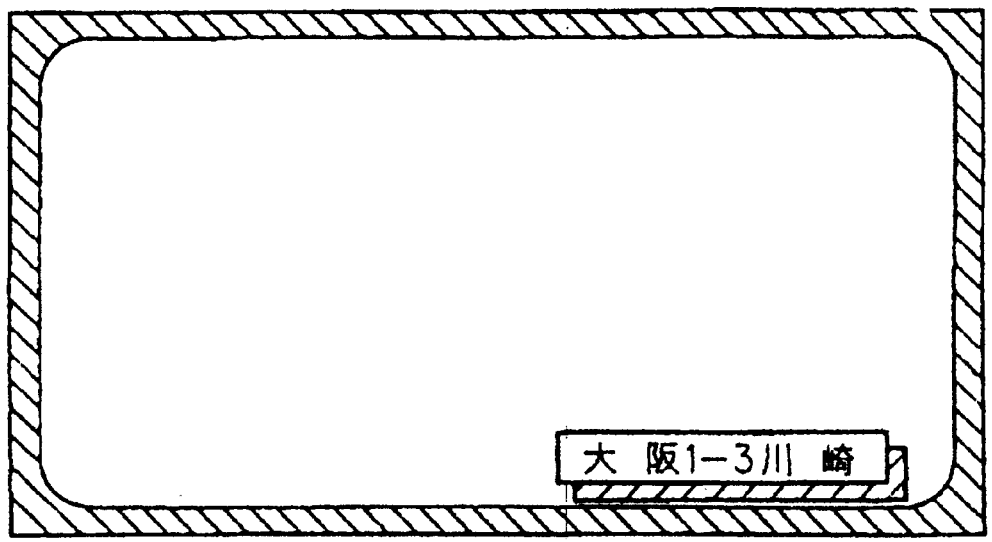
FIG. 23 is a diagram showing an output example in the same embodiment.

For example, when the seventh line of unit 1 in FIG. 6 is searched at step c17, the output result is obtained as shown in FIG. 23.

Or, when handling English data as shown in FIGS. 26 and 27, for example, if the fifth line of unit 2 in FIG. 27 is searched at step c17, the output result is obtained as shown in FIG. 31.

At steps c20 to step c21, the same process as at step b18 to step b19 in the flowchart in FIG. 14 showing the operation of the first embodiment of the second aspect of the invention is executed.

In this embodiment, out of character row data, first units changing similarly are searched, and data of a portion in the unit is selected by using the user keyword, but not limited to this operation, first the data of the portion in the unit containing the user keyword may be selected from the character row data, and then the data changing similarly may be selected from the data of the searched plural portions. This constitution comprises input means in which character row data divided in specified units is entered in time series having a specific interval, first memory means for storing the first entered character row data out of character row data entered in time series, second memory means for storing the later entered character row data out of the character row data entered in time series, comparing and judging means for comparing matching point and/or different point of the character row data of the first memory means and character row data of the second memory means, in every data of portion in the unit containing the entered keyword, and judging presence or absence of similarity between data of the portions to be compared on the basis of the result of comparison, output means for outputting the data of the portion judged to have similarity out of the units in the second memory means when judged to have similarity by the comparing and judging means, and update control means for updating the content of the second memory by the new character row data entered from the input means by updating the content of the first memory means by the character row data of the second memory means after comparing and judging by the comparing and judging means.

(Embodiment 8)

An eighth embodiment is described below while referring to the drawings.

The eighth embodiment relates to a teletext receiver applying the similar change information takeout method.

Figure 24:
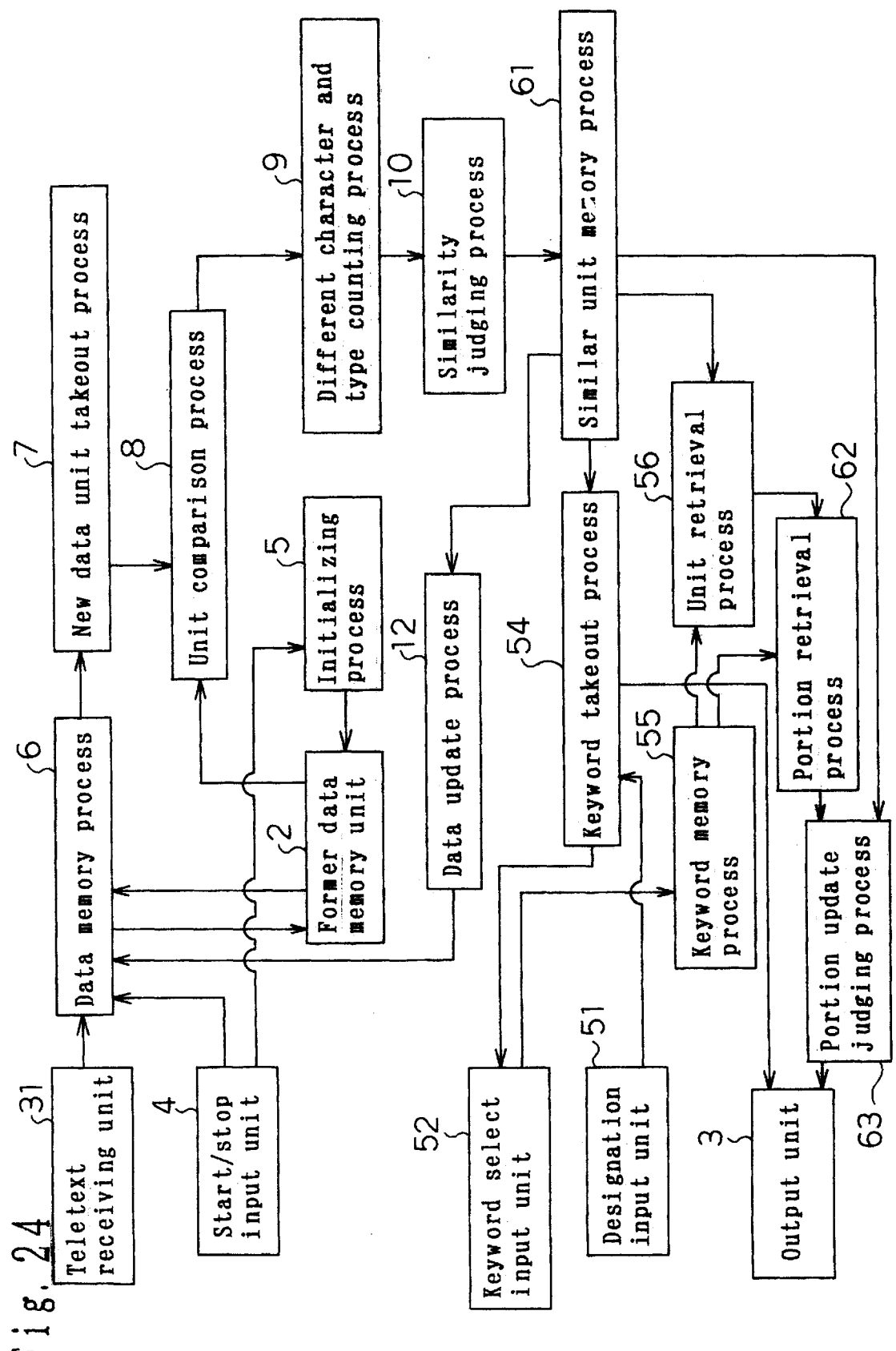
FIG. 24 is a block diagram showing a system configuration of teletext receiver in a second embodiment of the third aspect of the invention.

FIG. 24 is a system configuration diagram of the eighth embodiment. In FIG. 24, what differs from the system configuration of the first embodiment shown in FIG. 21 is that a teletext receiving unit 31 is provided instead of the input unit 1. Other constituent parts are same as in the system configuration of the first embodiment, and are hence identified with same reference numerals and explanations are omitted. Besides, the teletext receiving unit 31 shares in part with the constituent parts in FIG. 8 relating to the system configuration of the second embodiment, which are already explained in FIG. 8 and are hence omitted herein.

The hardware structure for executing thus constituted system is same as the hardware structure of the fifth embodiment shown in FIG. 18. Therefore, detailed description is omitted.

In the eighth embodiment, the teletext program received in the teletext receiving unit 31 is divided into pages of specific length, and what is handled as the unit in the first embodiment is replaced by the page in the program. Other processing is same as the process in the flowchart shown in FIG. 22. The data examples shown in FIGS. 5 and 6 presented in the first embodiment relate to the data on the basis of the program broadcast by teletext, and the intermediate processing example and output example are both same as in the first embodiment. Thus, when applied in the teletext receiver, in the television provided with function of receiving teletext, only the page containing the user keyword out of the pages containing similar change information can be displayed in the slave screen as shown in the output example in FIG. 23.

Incidentally, if English data as shown in FIGS. 26 and 27 is sent as the content of teletext, processing is done same as in the processing of English data explained in the fourth embodiment.

(Embodiment 9)

A ninth embodiment is described below by reference to the drawings.

The ninth embodiment relates to similar change information takeout method and similar change information takeout apparatus.

Figure 25:
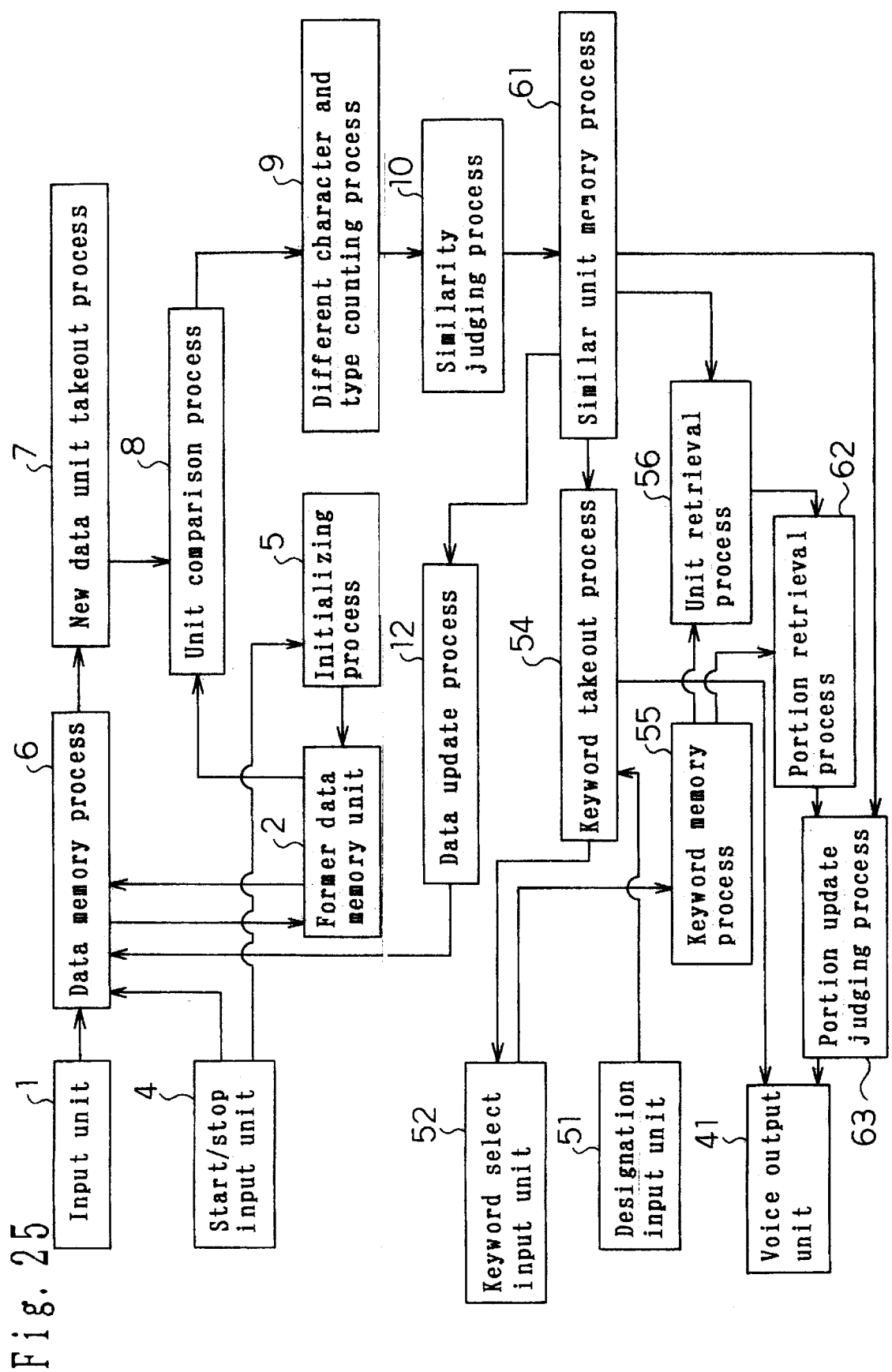
FIG. 25 is a block diagram showing a system configuration of similar change information takeout method and similar change information takeout apparatus in a third embodiment of the third aspect of the invention.

FIG. 25 is a system configuration diagram of the ninth embodiment. The constituent parts of the system configuration shown in FIG. 25 consist of the constituent parts of the system configuration of the seventh embodiment shown in FIG. 21, and the constituent parts of the system configuration of the third embodiment shown in FIG. 10. Therefore, same reference numerals are given to the corresponding constituent parts, and their explanations are omitted. The voice output unit 41 in the third embodiment is intended to convert the unit given as the character row data into voice and output, but in this embodiment, the portion in the unit searched in the portion retrieval process 62 is converted into voice and outputted. This portion is, however, give in the character row data same as the unit, it is converted into voice and outputted basically in the same process.

The hardware structure for executing thus constituted system is same as the hardware structure of the sixth embodiment shown in FIG. 20, and hence explanations are omitted.

Figure 22:
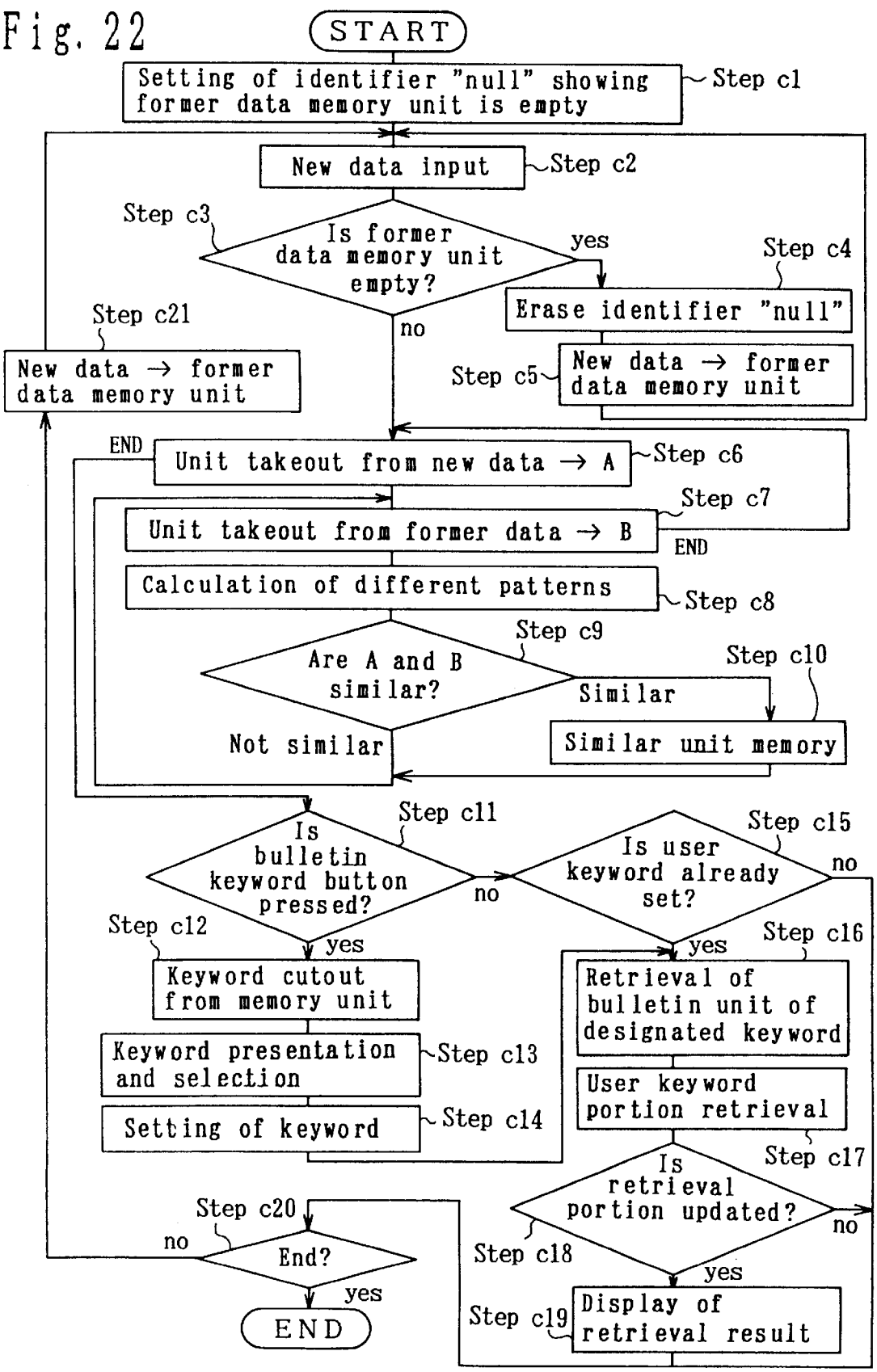
FIG. 22 is a flowchart showing operating procedure of the similar change information takeout method and similar change information takeout apparatus in the same embodiment.

The operation of the embodiment is basically same as the operation of the seventh embodiment shown in FIG. 22. What differs is that the portion in the unit searched at step c17 is converted into voice and outputted, instead of the search result display process at step c19. The portion in the unit searched at step c17 is character row data. Accordingly, the character codes must be sequentially converted into voice. As the method of converting into voice, various methods have been hitherto proposed, and any method may be employed in the invention.

In this embodiment, the input unit 1 is contained in the system configuration, but it may be replaced by the teletext receiving unit 31. In this case, receiving the teletext, only the page containing the similar change information is taken out, and the portion containing the user keyword in this page is searched, and the researched result is converted to voiced and presented to the user.

In the voice output unit 41, it is also possible to convert the English data shown in FIGS. 26 and 27 into voice and output. For such technique, various methods have been developed hitherto as the voice synthesizing technique. Therefore, in the same method as the processing of English data shown in the seventh embodiment, it is possible to process when the English data is entered or received also in this embodiment.

In this invention, in any embodiment, regardless of the unit or page containing similar change information, if once taken out, whether the same content is entered or received, it is not judged to be similar in the similarity judging process 10. Accordingly, if once outputted, it is not taken out as the unit or page containing the similar change information, until the content is updated next. Therefore, only when change is found by continuously monitoring the similar change information, the information is outputted from the output unit 3 in the seventh embodiment and eighth embodiment, or the voice output unit 41 in the ninth embodiment. Hence in the seventh embodiment or eighth embodiment, when outputting information, it may be considered to deliver a caution alerting sound such as beep sound and alarm sound in the output unit 3. It is therefore possible to draw attention by beep sound or the like only when the similar change info r mation is updated, by taking out and displaying the similar change information by the invention in, for example, a mobile appliance with teletext receiving function. Accordingly, without having to observe the screen continuously while driving, the progress of the game of the sport contained in the portion in the unit or the portion in the page designated, for example, by the user keyword can be known. Moreover, by converting and outputting as voice as in the third embodiment, the progress of the game can be known by the voice, without having to move the vision to the screen while driving an automobile. Hitherto, while driving, there was known a method of learning the progress of sport game by listening to the live broadcast through the radio, but for the user wanting to know only the progress of the game, there were following problems: 1) the broadcast of the entire game must be monitored, 2) the desired game is not always broadcast, and 3) while listening to the radio, the voice is continuously issued from the radio, which makes it hard to listen to the music comfortably by the car audio. In the teletext program, on the other hand, the progress of all games is broadcast, in principle, and it is noticed by voice only when there is a change in the process of the game according to the third embodiment of the invention, so that the above problems may be solved. In all embodiments of the invention, the constituent parts may be may be composed in the software or in the hardware. Moreover, the seventh embodiment or eighth embodiment may be combined with the ninth embodiment.

Thus, according to the first aspect of the invention, when the character row data divided into specific units, with each character expressed in character codes is entered in time series, if the units contain similar change information in which the information is updated in a short time such as the news of progress of a game of sport, and information not updated in a short time such as announcement of opening of the Olympic Games, only the similar change information can be taken out. As a result, it eliminates the trouble of the user to manipulate to take out only the necessary portion by observing many times the entire information entered in the time series in order to search the updated data of the similar change information. For example, in the teletext being broadcast at the present, there is a program broadcasting sports news, and this program is divided into several pages. Such program consists of pages containing similar change information and pages containing other information. Therefore, the user wishing to know the latest progress in the sports game, it was required to receive the teletext program often and search the similar change information by viewing the pages sequentially. In particular, since the updating of information is not automatically noticed in the teletext, the information may not be updated if the user monitors the information frequently, or when monitoring the information less frequently, the user cannot catch up with the updating of the information. To solve such problems, the invention allows the user to know the similar change information without having to do anything, by displaying only the page containing the similar change information always in a slave screen of a television as described in the foregoing embodiments. Moreover, since output is repeated only when the information is updated, updating may be noticed by the beep sound. The embodiments mainly corresponding to the first aspect of the invention are the first to third embodiments.

Incidentally, it may be considered that there are plural pages containing similar change information in the presented character row data.

In similar change information, for example, suppose the user wishes to know the progress of the game of the supporting team, about the sports bulletin of baseball or soccer. In this case, for the user supporting a specific baseball team, if the page containing similar change information is displayed, it does not mean that useful information for the user is presented. Therefore, the user is requested to designate what information is demanded in the similar change information, and according to this designation, only the page containing the required similar change information is searched and presented.

According to the second embodiment of the invention, only the unit necessary for the use is taken out when taking out the similar change information. As mentioned above, generally, similar change information may be contained in plural units depending on the input data. In this case, if merely the plural units containing the similar change information are taken out, plural units are taken out, and the user must search the desired unit from them. In the invention, if similar change information is contained in plural units, when the user designates the desired similar change information by keyword, only the unit containing necessary information is searched and displayed. As a result, if similar change information is contained in plural units, it eliminates the trouble of the user to search the unit containing the desired information. The keyword designated by the user is to be selected from those being cut out from the actually entered data, and, for example, the team name or proper name in the sports may be presented as a selectable keyword. The embodiments mainly corresponding to the second aspect of the invention are the fourth to sixth embodiments.

Moreover, when the page containing the necessary information is searched according to the designation by the user and presented to the user, other information than necessary information may be contained in the page. For the user, it feels bothersome when unnecessary information is presented together with the necessary information. Therefore, instead of the unit of the page, only the necessary information is taken and presented. By thus taking out only the necessary information, the similar change information may be always displayed in a corner of the screen while watching television.

According to the third aspect of the invention, when taking out similar change information, only the unit necessary for the user is take out, and further only the necessary portion of the unit can be taken out. Depending on the input data, many pieces of similar change information may be contained in one unit. In such a case, if the unit containing similar change information is merely taken out, unnecessary information of the user contained in the unit is also taken out, which may feel bothersome for the user. In the invention, if plural pieces of similar change information are contained in one unit, by designating the similar change information desired by the user by keyword, only the portion containing necessary information is searched and displayed. As a result, as compared with the case of displaying the unit containing the similar change information as the slave screen of television, for example, only the line is displayed, and the display region may be smaller. The embodiments mainly corresponding to the third aspect of the invention are the seventh to ninth embodiments.

As clear from the description herein, the invention offers the advantage of obtaining the information changing with the time more easily than in the prior art.

Though the embodiments are described in case of hardware constitution, the prevent invention can be realized by using computer software.

What is claimed is:

1. A similar change information takeout method comprising the steps of:
   (a) feeding character row data divided into units in time series having a time interval,
   (b) comparing matching points and different points of earlier character row data and successive later character row data in the every unit,
   (c) calculating a tolerance value corresponding to a degree of similarity between units of character row data; calculating the tolerance value corresponding to the degree of similarity based on quantities of occurrences of difference patterns; using information that expresses a degree of difficulty of the occurrences of each of the difference patterns in calculating the tolerance value; and said information is set according to be taken out the similar change information; and
   (d) selectively issuing a unit, based on the tolerance value corresponding to the degree of similarity, out of the units in the later character row data.

2. A similar change information takeout method according to claim 1 wherein step (d) includes comparing the tolerance value corresponding to the degree of similarity to a predetermined threshold value.

3. A similar change information takeout method according to claim 1 wherein step (c) includes calculating the tolerance value corresponding to the degree of similarity based on quantities of occurrences of predetermined difference patterns.

4. A similar change information takeout method according to claim 3 wherein the tolerance value is calculated using the following equation:

$$G = \sum_{i=1}^{n} DP_i t_i$$

where G is the tolerance value, $DP_i$ is a quantity of occurrences of a difference pattern, $t_i$ is a constant corresponding to a difference pattern $DP_i$, and n is a quantity of difference patterns.

5. A similar change information takeout apparatus comprising:
   input means for inputting character row data which are divided into units having time series interval,
   first memory means for storing earlier entered character row data out of the character row data input in time series,
   second memory means for storing later entered character row data out of the character row data input in time series,
   comparing and judging means for comparing matching point and different point of the character row data of the first memory means and the character row data of the second memory means in the every unit, and judging similarity by calculating a tolerance value corresponding to a degree of similarity between the earlier entered character row data stored in the first memory means and the later entered character row data stored in the second memory means and comparing the tolerance value to a predetermined threshold, output means for selectively outputting a unit, based on the value corresponding to the degree of similarity, out of the units in the second memory means, and update control means for (1) updating the content of the first memory means using the character row data of the second memory means after comparing and judging by the comparing and judging means and (2) updating the content of the second memory means using new character row data input from the input means, wherein calculating the tolerance value corresponding to the degree of similarity is based on quantities of occurrences of difference patterns, and wherein information expressing a degree of difficulty of the occurrences of each of the difference patterns is reflected in the calculating of the tolerance value, and said information is set according to be taken out the similar change information.

6. A similar change information takeout apparatus according to claim 5, further comprising a display means for displaying the unit outputted from the output means, wherein the outputted unit is displayed continuously by the display means until the output means outputs an updated unit, and when the output means issues the updated unit, the display means displays the updated unit with a notification that the unit is updated.

7. A similar change information takeout apparatus according to claim 5, further comprising a display means for displaying the unit outputted from the output means, wherein the outputted unit is displayed by the display means for a predetermined time.

8. A similar change information takeout apparatus according to claim 7, wherein the predetermined time is the time beginning with the output from the output means until next new character row data is input from the input means.

9. A similar change information takeout method comprising the steps of:

accepting character row data divided in units with each character expressed in character codes by input means as being entered sequentially in time series, storing earlier entered character row data out of the character row data entered in time series in a first memory means, storing later entered character row data out of the character row data entered in time series in a second memory means, and taking out sequentially and comparing character by character the units stored in the second memory means with the units stored in the first memory means, calculating a tolerance value corresponding to a degree of similarity between compared units, selectively issuing a unit, based on the tolerance value corresponding to the degree of similarity, out of the units in the later entered character row data, and updating the character row data of the first memory means using the character row data of the second memory means, wherein calculating the tolerance value corresponding to the degree of similarity is based on quantities of occurrences of difference patterns and, wherein information expressing a degree of difficulty of the occurrences of each of the difference patterns is reflected in the calculating of the tolerance value, and said information is set according to be taken out the similar change information.

10. A similar change information takeout method according to claim 9 further comprising the step of providing an audible signal to indicate that a unit is selectively issued.

11. A similar change information takeout apparatus comprising:

input means for accepting character row data divided into units, with each character expressed in character codes, as being entered sequentially in time series, first memory means for storing earlier entered character row data out of the character row data entered in time series, second memory means for storing later entered character row data out of the character row data entered in time series, and control means for taking out sequentially and comparing character by character the units stored in the second memory means with the units stored in the first memory means, calculating a tolerance value corresponding to a degree of similarity between compared units, selectively issuing a unit, based on the tolerance value corresponding to the degree of similarity, out of the units in the later entered character row data, and updating the character row data of the first memory means using the character row data of the second memory means, wherein calculating the tolerance value corresponding to the degree of similarity is based on quantities of occurrences of difference patterns, and wherein information expressing a degree of difficulty of the occurrences of each of the difference patterns is reflected in the calculating of the tolerance value, and said information is set according to be taken out the similar change information.

12. A teletext receiver comprising:

teletext receiving means for receiving teletext programs transmitted as character row data with each program divided into pages of certain length, first memory means for storing earlier transmitted character row data out of the transmitted character row data, second memory means for storing later transmitted character row data out of the transmitted row data, and control means for taking out sequentially and comparing character by character the pages stored in the second memory means with the pages stored in the first memory means, calculating a tolerance value corresponding to a degree of similarity between compared pages, selectively issuing a page, based on the tolerance value corresponding to the degree of similarity, out of the pages in the later transmitted character row data, and updating the character row data of the first memory means using the character row data of the second memory means, wherein calculating the tolerance value corresponding to the degree of similarity is based on quantities of occurrences of difference patterns, and wherein information expressing a degree of difficulty of the occurrences of each of the difference patterns is reflected in the calculating of the tolerance value, and said information is set according to be taken out the similar change information.

13. A similar change information takeout apparatus comprising:

means for receiving a keyword, input means for inputting character row data divided into units having time series interval, first memory means for storing earlier entered character row data out of the character row data input in time series, second memory means for storing later entered character row data out of the character row data input in time series, comparing and judging means for comparing matching point and different point of the character row data of the first memory means and the character row data of the second memory means in the every unit, and judging similarity between compared units of character row data by calculating a tolerance value corresponding to a degree of similarity between the earlier entered character row data stored in the first memory means and the later entered character row data stored in the second memory means and comparing the tolerance value to a predetermined threshold value, output means for comparing the received keyword to character row data of the units in the second memory means judged to have similarity and outputting a unit containing the received keyword out of the units in the second memory means judged to have similarity by the comparing and judging means, and update control means for (1) updating the content of the first memory means using the character row data of the second memory means after comparing and judging by the comparing and judging means and (2) updating the content of the second memory means using new character row data input from the input means.

14. A similar change information takeout apparatus comprising:

means for receiving a keyword, input means for inputting character row data divided into units having time series interval, first memory means for storing earlier entered character row data out of the character row data input in time series, second memory means for storing later entered character row data out of the character row data input in time series, comparing and judging means for comparing matching point and different point of the character row data of the first memory means and the character row data of the second memory means in the each unit between the selected units for units containing the received keyword, and judging similarity by calculating a tolerance value corresponding to a degree of similarity between the earlier entered character row data stored in the first memory means and the later entered character row data stored in the second memory means and comparing the tolerance value to a predetermined threshold value, output means for selectively outputting a unit, based on the degree of similarity, out of the units in the second memory means, and update control means for (1) updating the content of the first memory means using the character row data of the second memory means after comparing and judging by the comparing and judging means and (2) updating the content of the second memory means using new character row data input from the input means.

15. A similar change information takeout method comprising the steps of:

accepting character row data divided in units with each character expressed in character codes by input means as being entered sequentially in time series, storing earlier entered character row data out of the character row data entered in time series in a first memory means, storing later entered character row data out of the character row data entered in time series in a second memory means, and taking out sequentially and comparing character by character the units stored in the second memory means with the units stored in the first memory means, judging similarity of compared units by calculating a tolerance value corresponding to a degree of similarity between compared units and comparing the tolerance value to a predetermined threshold, storing the unit judged to have similarity, obtaining instruction for cutting out keywords, cutting out the keywords from the unit judged to have similarity, displaying the cut-out keywords by display means, storing the keyword selected by the keyword select input means, out of the displayed keywords, as the user keyword, determining whether the unit judged to have similarity contains the user keyword, issuing the unit judged to have similarity if it contains the user keyword, and updating the data of the first memory means using the data of the second memory means.

16. A similar change information takeout method of claim 9 or 15, wherein the output means is voice output means for converting the unit into voice and issuing.

17. A similar change information takeout apparatus comprising:

input means for accepting character row data sequentially entered in time series, the character row data divided into units, with each character expressed in character codes, first memory means for storing earlier entered character row data out of the character row data entered in time series, second memory means for storing later entered character row data out of the character row data entered in time series, keyword select input means for accepting selection of a keyword, and control means for taking out sequentially and comparing character by character the units stored in the second memory means with the units stored in the first memory means, judging similarity of compared units by calculating a tolerance value corresponding to a degree of similarity between compared units and comparing the tolerance value to a predetermined threshold, storing the unit judged to have similarity, if judged to have similarity, obtaining instruction for cutting out keywords, cutting out the keywords from the unit judged to have similarity, displaying the cut-out keywords by using display means, storing the keyword selected by the keyword select input means, out of the displayed keywords, as the user keyword, determining whether the unit judged to have similarity contains the user keyword, issuing the unit judged to have similarity if it contains the user keyword, and updating the data of the first memory means using the data of the second data memory means.

18. A similar change information takeout apparatus of claim 11 or 17, wherein the output means is voice output means for converting the unit into voice and issuing.

19. A teletext receiver comprising:

teletext receiving means for receiving teletext programs transmitted as character row data with each program divided into pages of certain length, first memory means for storing earlier transmitted character row data out of the transmitted character row data, second memory means for storing later transmitted character row data out of the transmitted character row data, keyword select input means for accepting selection of a keyword, and control means for taking out sequentially and comparing character by character the pages stored in the second memory means with the pages stored in the first memory means, judging similarity of compared pages by calculating a tolerance value corresponding to a degree of similarity between compared pages and comparing the tolerance value to a predetermined threshold, storing the unit judged to have similarity, obtaining instruction for cutting out keywords, cutting out the keywords from the page judged to have similarity, displaying the cut-out keywords by using display means, storing the keyword selected by the keyword select input means, out of the displayed keywords, as the user keyword, identifying whether the page judged to have similarity contains the user keyword, issuing the page judged to have similarity page if it contains the user keyword using output means, and updating the data of the first memory means using the data of the second memory means.

20. A teletext receiver of claim 12 or 19, wherein the output means is voice output means for converting the unit into voice and issuing.

21. A similar change information takeout apparatus comprising:

keyword input means for accepting selection of a keyword, input means for inputting character row data divided into units having time series interval, first memory means for storing earlier entered character row data out of the character row data input in time series, second memory means for storing later entered character row data out of the character row data input in time series, comparing and judging means for comparing matching point and/or different point of the character row data of the first memory means and the character row data of the second memory means in the every unit, and judging similarity by calculating a tolerance value corresponding to a degree of similarity between the earlier entered character row data stored in the first memory means and the later entered character row data stored in the second memory means and comparing the tolerance value to a predetermined threshold value, portion retrieval means for retrieving a portion of a unit including the keyword out of the units of the second memory means judged to have similarity by the comparing and judging means, change judging means for judging whether the retrieved data is changed from the memory content in the first memory means, output means for outputting the retrieved data when judged to have been changed, and update control means for (1) updating the content of the first memory means using the character row data of the second memory means after comparing and judging by the change judging means and (2) updating the content of the second memory means using new character row data input from the input means.

22. A similar change information takeout apparatus comprising:

keyword input means for accepting selection of a keyword, input means for inputting character row data divided into units having time series interval, first memory means for storing earlier entered character row data out of the character row data input in time series, second memory means for storing later entered character row data out of the character row data input in time series, comparing and judging means for comparing matching point and/or different point of the character row data of a portion of every unit in the first memory means which contains the keyword with the character row data of a portion of every unit in the second memory means which contains the keyword, and judging similarity by calculating a tolerance value corresponding to a degree of similarity between the compared portions of the earlier entered character row data stored in the first memory means and the later entered character row data stored in the second memory means and comparing the tolerance value to a predetermined threshold value, output means for outputting the data of the portion judged to have similarity out of the units in the second memory means when judged to have similarity by the comparing and judging means, and update control means for (1) updating the content of the first memory means using the character row data of the second memory means after comparing and judging by the comparing and judging means and (2) updating the content of the second memory means using new character row data input from the input means.

23. A similar change information takeout method comprising the steps of:

accepting character row data divided in units with each character expressed in character codes by input means as being entered sequentially in time series, storing earlier entered character row data out of the character row data entered in time series in a first memory means, storing later entered character row data out of the character row data entered in time series in a second memory means, accepting selection of a keyword by a keyword select input means, and taking out sequentially and comparing character by character the units stored in the second memory means with the units stored in the first memory means, judging similarity of compared units by calculating a tolerance value corresponding to a degree of similarity between compared units and comparing the tolerance value to a predetermined threshold, storing a unit taken out from the second memory means as second information and a unit taken out from the first memory means as first information if judged to have similarity, obtaining instruction for cutting out keywords, cutting out the keywords from the unit stored as the second information, displaying the cut-out keywords using display means, storing the keyword selected by the keyword select input means, out of the displayed keywords, as the user keyword, searching the unit stored as the second information and the unit stored as the first information for units containing the user keyword, comparing the data of portions of the searched units containing the user keyword, issuing if different, the data of the portion taken out from the unit stored as the second information using output means, and updating the data of the first memory means using the data of the second memory means.

24. A similar change information takeout method of claim 23, wherein the output means is voice output means for converting the data of the portion in the unit into voice and issuing.

25. A similar change information takeout apparatus comprising:

input means for accepting character row data divided into units with each character expressed in character codes as being entered sequentially in time series, first memory means for storing earlier entered character row data out of the character row data entered in time series, second memory means for storing later entered character row data out of the character row data entered in time series, keyword selecting means for accepting selection of a keyword, and control means for taking out sequentially and comparing character by character the units stored in the second memory means with the units stored in the first memory means, judging similarity of compared units by calculating a tolerance value corresponding to a degree of similarity between compared units and comparing the tolerance value to a predetermined threshold, storing a unit taken out from the second memory means as second information and storing the unit taken out from the first memory means as first information, obtaining instruction for cutting out keywords, cutting out the keywords from the unit stored as the second information, displaying the cut-out keywords using display means, storing the keyword selected by the keyword select input means, out of the displayed keywords, as the user keyword, searching the unit stored as the second information and the unit stored as the first information for units containing the user keyword, comparing the data of portions of the searched units containing the user keyword, issuing if different, the data of the portion taken out from the unit stored as the second information using output means, and updating the data of the first memory means using the data of the second memory means.

26. A similar change information takeout apparatus of claim 25, wherein the output means is voice output means for converting the data of the portion in the unit into voice and issuing.

27. A teletext receiver comprising:

teletext receiving means for receiving teletext programs transmitted as character row data with each program divided into pages of certain length, first memory means for storing earlier transmitted character row data out of the transmitted character row data, second memory means for storing later transmitted character row data out of the transmitted character row data, keyword selecting means for accepting selection of a keyword, and control means for taking out sequentially and comparing character by character the pages stored in the second memory means with the pages stored in the first memory means, judging similarity of compared pages by calculating a tolerance value corresponding to a degree of similarity between compared pages and comparing the tolerance value to a predetermined threshold, storing the page taken out from the second memory means as second information and storing the page taken out from the first memory means as first information if judged to have similarity, obtaining instruction for cutting out keywords, cutting out the keywords from the page stored as second information, displaying the cut-out keywords using display means, storing the keyword selected by the keyword select input means, out of the displayed keywords, as the user keyword, searching the page stored as the second information and the page stored as the first information for pages containing the user keyword, comparing the data of the portions of the searched pages containing the user keyword, issuing, if different, the data of the portion taken out from the page stored as the second information using the output means, and updating the data of the first memory means using the data of the second memory means.

28. A teletext receiver of claim 27, wherein the output means is voice output means for converting the data of the portion in the unit into voice and issuing.

29. A similar change information takeout method comprising the steps of:

(a) feeding character row data divided into units in time series having a time interval, (b) comparing matching points and/or different points of earlier character row data and successive later character row data in the every unit, (c) calculating a tolerance value corresponding to a degree of similarity between units of character row data; and (d) selectively issuing a unit, based on the tolerance value corresponding to the degree of similarity, out of the units in the later character row data, wherein step (c) includes calculating the tolerance value corresponding to the degree of similarity based on quantities of occurrences of predetermined difference patterns, and the tolerance value is calculated using the following equation:

$$G = \sum_{i=1}^{n} DP_i t_i$$

where G is the tolerance value, $DP_i$ is a quantity of occurrences of a difference pattern, $t_i$ is a constant corresponding to a difference pattern $DP_i$, and n is a quantity of difference patterns.

* * * * *